US012156212B2

(12) United States Patent
Shin et al.

(10) Patent No.: US 12,156,212 B2
(45) Date of Patent: Nov. 26, 2024

(54) METHOD AND DEVICE FOR SUPPORTING SIDELINK MULTI-ANTENNA TRANSMISSION IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Hyunseok Ryu, Gyeonggi-do (KR); Sungjin Park, Gyeonggi-do (KR); Taehan Bae, Gyeonggi-do (KR); Jeongho Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 342 days.

(21) Appl. No.: 17/560,832

(22) Filed: Dec. 23, 2021

(65) Prior Publication Data
US 2022/0210779 A1     Jun. 30, 2022

(30) Foreign Application Priority Data
Dec. 24, 2020   (KR) .................. 10-2020-0183710

(51) Int. Cl.
*H04W 72/20*     (2023.01)
*H04L 5/00*      (2006.01)

(52) U.S. Cl.
CPC .......... *H04W 72/20* (2023.01); *H04L 5/0048* (2013.01); *H04L 5/0094* (2013.01)

(58) Field of Classification Search
CPC ..... H04W 72/20; H04L 5/0048; H04L 5/0094
(Continued)

(56) References Cited

U.S. PATENT DOCUMENTS 11,509,445 B2 * 11/2022 Peng .................... H04L 1/00
11,546,095 B2 *  1/2023 Kim ............... H04W 72/1263
(Continued)

FOREIGN PATENT DOCUMENTS

KR   10-2019-0131381        11/2019
KR      20220037492 A  *    3/2022
(Continued)

OTHER PUBLICATIONS

3GPP, 3rd Generation Partnership Project; Technical Specification Group Radio Access Network; NR; Physical Layer Procedures for Data (Release 16), 3GPP TS 38.214 V16.3.0, Sep. 2020, 166 pages.
(Continued)

*Primary Examiner* — Melvin H Pollack
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of things (IoT). The present disclosure may be applied to intelligent services based on the 5G communication technology and the IoT-related technology, such as smart home, smart building, smart city, smart car, connected car, health care, digital education, smart retail, security and safety services. The method performed by a first terminal in a wireless communication system is provided. The method includes identifying configuration information related to sidelink communication, determining first information related to a physical sidelink shared channel (PSSCH) demodulation reference signal (DMRS) for a second terminal based on the configuration information, and transmitting, to the second terminal, sidelink control information (SCI) including the first information.

16 Claims, 18 Drawing Sheets

(58) Field of Classification Search
USPC .................................................. 370/329
See application file for complete search history.

(56) References Cited

U.S. PATENT DOCUMENTS

| | | | | |
|---|---|---|---|---|
| 11,570,797 | B2* | 1/2023 | Li | H04W 76/14 |
| 11,671,965 | B2* | 6/2023 | Hui | H04L 1/1812 |
| | | | | 370/329 |
| 11,678,327 | B2* | 6/2023 | Park | H04W 72/21 |
| | | | | 370/329 |
| 11,683,812 | B2* | 6/2023 | Dahlman | H04L 5/0098 |
| | | | | 370/329 |
| 11,689,903 | B2* | 6/2023 | Nguyen | H04W 4/46 |
| | | | | 455/450 |
| 11,695,516 | B2* | 7/2023 | Huang | H04L 1/1812 |
| | | | | 370/312 |
| 11,711,677 | B2* | 7/2023 | Hwang | H04L 1/1854 |
| | | | | 370/329 |
| 11,736,220 | B2* | 8/2023 | Li | H04W 84/005 |
| | | | | 370/329 |
| 11,737,072 | B2* | 8/2023 | Kim | H04W 72/046 |
| | | | | 370/329 |
| 11,757,543 | B2* | 9/2023 | Chervyakov | H04B 17/345 |
| | | | | 370/252 |
| 11,758,439 | B2* | 9/2023 | Freda | H04W 28/0268 |
| | | | | 370/229 |
| 11,758,546 | B2* | 9/2023 | Park | H04W 72/21 |
| | | | | 370/329 |
| 11,765,696 | B2* | 9/2023 | Wu | H04L 5/0078 |
| | | | | 370/329 |
| 11,785,632 | B2* | 10/2023 | Kim | H04L 5/0091 |
| | | | | 370/329 |
| 11,792,796 | B2* | 10/2023 | Cheng | H04W 72/20 |
| | | | | 370/329 |
| 11,811,694 | B2* | 11/2023 | Mondal | H04L 5/0023 |
| 11,818,070 | B2* | 11/2023 | Do | H04W 72/20 |
| 11,844,093 | B2* | 12/2023 | Lee | H04B 17/328 |
| 11,856,463 | B2* | 12/2023 | Fakoorian | H04W 28/0278 |
| 11,876,624 | B2* | 1/2024 | Kim | H04L 1/1887 |
| 2020/0228247 | A1 | 7/2020 | Guo et al. | |
| 2021/0266868 | A1 | 8/2021 | Shin et al. | |
| 2022/0338067 | A1* | 10/2022 | Lee | H04W 28/26 |
| 2022/0377724 | A1* | 11/2022 | Yoshioka | H04L 5/0048 |
| 2022/0394697 | A1* | 12/2022 | Kim | H04W 72/54 |
| 2022/0394702 | A1* | 12/2022 | Lee | H04L 1/1812 |
| 2022/0416976 | A1* | 12/2022 | Baek | H04W 72/51 |
| 2023/0007628 | A1* | 1/2023 | Yoshioka | H04L 1/1896 |
| 2023/0072122 | A1* | 3/2023 | Zhao | H04W 72/20 |
| 2023/0075899 | A1* | 3/2023 | Zhao | H04W 72/20 |
| 2023/0164814 | A1* | 5/2023 | Miao | H04W 72/40 |
| | | | | 370/329 |
| 2023/0199801 | A1* | 6/2023 | Hahn | H04W 72/25 |
| | | | | 370/329 |
| 2023/0232201 | A1* | 7/2023 | Miao | H04W 72/25 |
| | | | | 370/329 |
| 2023/0300752 | A1* | 9/2023 | Li | H04W 76/28 |
| | | | | 370/310 |
| 2023/0328760 | A1* | 10/2023 | Yang | H04W 72/25 |
| | | | | 370/329 |
| 2023/0361830 | A1* | 11/2023 | Liu | H04B 7/0626 |
| 2023/0396386 | A1* | 12/2023 | Zhu | H04L 5/0053 |
| 2023/0397190 | A1* | 12/2023 | Eriksson | H04W 72/1263 |
| 2023/0403640 | A1* | 12/2023 | Kunz | H04W 48/16 |
| 2024/0008074 | A1* | 1/2024 | Miao | H04W 74/0808 |

FOREIGN PATENT DOCUMENTS

| | | |
|---|---|---|
| WO | WO 2020/197610 | 10/2020 |
| WO | WO 2020/220853 | 11/2020 |

OTHER PUBLICATIONS

International Search Report dated Apr. 6, 2022 issued in counterpart application No. PCT/KR2021/019816, 9 pages.

* cited by examiner

METHOD AND DEVICE FOR SUPPORTING SIDELINK MULTI-ANTENNA TRANSMISSION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2020-0183710, filed on Dec. 24, 2020, in the Korean Intellectual Property Office, the disclosure of which is incorporated herein by reference in its entirety.

BACKGROUND

1. Field

The disclosure relates to a wireless mobile communication system and, more particularly, to a method and device for supporting multi-antenna transmission in a procedure in which a vehicle terminal supporting vehicle communication (i.e., vehicle-to-everything (V2X)) transmits information to or receives information from another vehicle terminal and a pedestrian portable terminal by using a sidelink.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Multiple services may be provided to users in a 5G communication system, and in order to provide the multiple services to users, a method capable of providing respective services according to characteristics within the same time interval, and a device using the method are required. Various services provided by the 5G communication system are being studied, and one of the services is a service that satisfies requirements for low latency and high reliability.

In a case of vehicle communication, in a new radio (NR) V2X system, device-to-device (D2D) unicast communication, groupcast (or multi-cast) communication, and broadcast communication are supported. Unlike LTE V2X aiming at transmission or reception of basic safety information required for road driving of vehicles, NR V2X aims to provide more advanced services, such as platooning, advanced driving, an extended sensor, and remote driving.

SUMMARY

The disclosure relates to a method and a terminal operation for supporting single-user MIMO (SU-MIMO), multi-user MIMO (MU-MIMO), and non-coherent joint transmission (NCJT) in a sidelink. The disclosure relates to supporting multi-antenna transmission in sidelink communication. According to an embodiment of the disclosure, transmission efficiency in a sidelink can be effectively improved.

In an embodiment, a method performed by a first terminal in a wireless communication system is provided. The method includes identifying configuration information related to sidelink communication, determining first information related to a physical sidelink shared channel (PSSCH) demodulation reference signal (DMRS) for a second terminal based on the configuration information, and transmitting, to the second terminal, sidelink control information (SCI) including the first information.

In an embodiment, a method performed by a second terminal in a wireless communication system is provided. The method includes identifying configuration information related to sidelink communication, receiving, from a first terminal, sidelink control information (SCI) including first information related to a physical sidelink shared channel (PSSCH) demodulation reference signal (DMRS) for the second terminal based on the configuration information, and performing measurement of at least one PSSCH DMRS based on the SCI.

In an embodiment, a first terminal in a wireless communication system is provided. The first terminal includes a transceiver and a controller. The controller is configured to identify configuration information related to sidelink communication, determine first information related to a physical sidelink shared channel (PSSCH) demodulation reference signal (DMRS) for a second terminal based on the configuration information, and transmit, to the second terminal via the transceiver, sidelink control information (SCI) including the first information.

In an embodiment, a second terminal in a wireless communication system is provided. The second terminal includes a transceiver and a controller. The controller is configured to identify configuration information related to sidelink communication, receive, from a first terminal via the transceiver, sidelink control information (SCI) including first information related to a physical sidelink shared channel (PSSCH) demodulation reference signal (DMRS) for the second terminal based on the configuration information, and perform measurement of at least one PSSCH DMRS based on the SCI.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
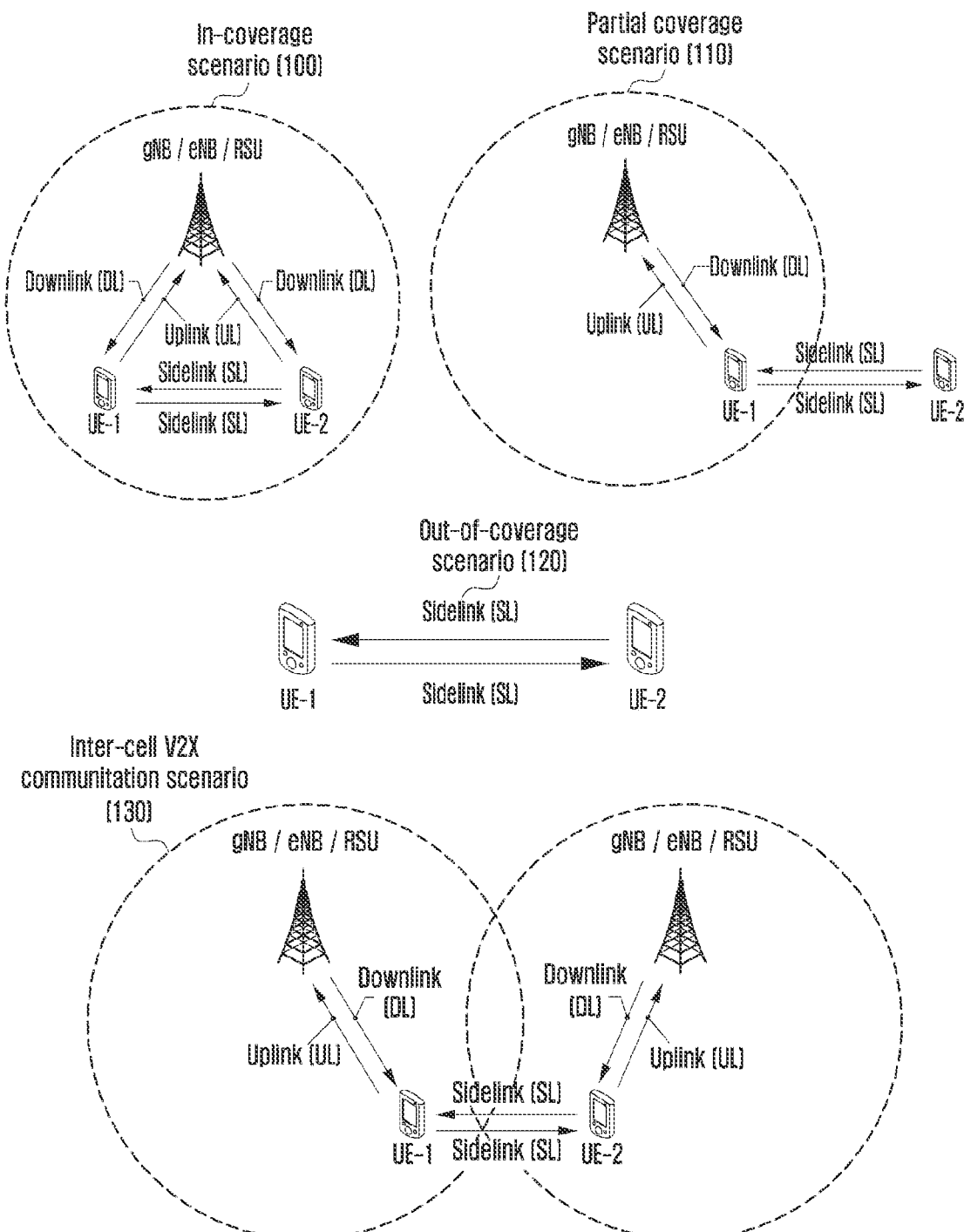
FIG. 1 illustrates a system according to an embodiment.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring the main idea of the disclosure and more clearly convey the main idea.

For the similar reasons, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, when executed by the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions executed on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the term "unit" does not always have a meaning limited to software or hardware. The unit may be constructed either to be stored in an addressable storage medium or to execute one or more processors. Therefore, the unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. Moreover, the elements and units or may be implemented to reproduce one or more CPUs within a device or a security multimedia card. Further, the unit in the embodiments may include one or more processors.

Detailed descriptions of embodiments of the disclosure are mainly directed to a new RAN (NR) as a radio access network and a packet core (5G system, 5G core network, or next generation core (NG core)) as a core network, which are specified in the 5G mobile communication standards disclosed by the 3rd generation partnership project long-term evolution (3GPP) that is a mobile communication standardization group, but the main idea of the disclosure may be applicable to other communication systems having similar backgrounds through some modifications without significantly departing from the scope of the disclosure, based on determinations of those skilled in the art.

In a 5G system, in order to support network automation, a network data collection and analysis function (NWDAF), which is a network function that provides a function of analyzing and providing data collected from a 5G network, may be defined. The NWDAF may collect/store/analyze information from the 5G network to provide a result thereof to an unspecified network function (NF), and an analysis result may be used independently in each NF.

In the following description, some of terms and names defined in the 3rd generation partnership project long term evolution (3GPP LTE) standards may be used for the convenience of description. However, the disclosure is not limited by these terms and names, and may be applied in the same way to systems that conform other standards.

Further, in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In order to meet wireless data traffic demands that have increased after 4G communication system commercialization, efforts to develop an improved 5G communication system (NR) have been undertaken. The 5G communication system has been designed to use resources in a mmWave band (e.g., a 28 GHz frequency band) in order to achieve a high data transmission rate. In the 5G communication system, technologies, such as beamforming, massive MIMO, FD-MIMO, array antennas, analog beam-forming, and large-scale antennas are being discussed to mitigate a propagation path loss in the mmWave band and increase a propagation transmission distance. In addition, unlike LTE, the 5G communication system supports various subcarrier spacings, such as 30 kHz, 60 kHz, and 120 kHz including 15 kHz, and a physical control channel uses polar coding and a physical data channel uses low density parity check (LDPC) coding. Further, not only direct Fourier transform spread orthogonal frequency division multiplexing (DFT-S-OFDM) but also cyclic-prefix orthogonal frequency division multiplexing (CP-OFDM) are used as a waveform for uplink transmission. While resources for hybrid automatic repeat request (HARQ) retransmission in units of transport blocks (TBs) are allocated in LTE, resources for HARQ retransmission based on a code block group (CBG) including multiple code blocks (CBs) may be additionally allocated in 5G.

In addition, in 5G communication systems, development for system network improvement is under way based on advanced small cells, cloud RANs, ultra-dense networks, D2D communication, wireless backhaul, moving network, cooperative communication, CoMP, reception-end interference cancellation and the like.

Multi-antenna transmission may be considered in sidelink communication. For multi-antenna transmission, the following detailed methods may be used:

SU-MIMO (Single User Multiple Input Multiple Output)
MU-MIMO (Multiple User Multiple Input Multiple Output)
NCJT (Non-Coherent Joint Transmission)

First, in a sidelink, SU-MIMO is a method of performing MIMO transmission or reception between one transmission terminal and one reception terminal. Unlike this, MU-MIMO is a method of performing MIMO transmission or reception between one transmission terminal and multiple reception terminals. Unlike coherent joint transmission (CJT) that is transmission in synchronization at different transmission points in multi-antenna transmission, in an environment where CJT transmission is difficult, such as multiple transmission reception points (multi-TRP) and a multi-panel, NCJT that enables transmission without synchronization may be considered. Here, without synchronization may refer to phases of signals transmitted from different transmission points that are not the same. The disclosure provides a standard support method for supporting such multi-antenna transmission in a sidelink. Specifically, a DMRS port indication method and a CDM group number indication method may be considered. A method of using one or more transmission configuration indicators (TCIs) may be considered to support NCJT. In addition, in the sidelink, unlike in communication between a base station and a terminal, a DMRS overhead may not be determined by a DMRS overhead actually used by a terminal when a transport block size (TBS) for PSSCH transmission is determined. The disclosure also provides a method of determining a DMRS overhead when a TBS for PSSCH transmission is determined in a case where the above multi-antenna transmission is supported.

Embodiments have been disclosed herein to support the above-described scenario and, in particular, to provide a method and a device for performing multi-antenna transmission in a sidelink.

FIG. 1 illustrates a system according to an embodiment.

Referring to FIG. 1, FIG. 1 illustrates an example of a case (in-coverage, IC) 100 in which all V2X terminals (UE-1 and UE-2) are located within coverage of a base station. All the V2X terminals may receive data and control information via a downlink (DL) from the base station or may transmit data and control information via an uplink (UL) to the base station. The data and control information may be data and control information for V2X communication or general cellular communication. The V2X terminals may transmit or receive the data and control information for V2X communication via a sidelink (SL).

Referring to FIG. 1, FIG. 1 illustrates an example of a case 110 in which UE-1 among the V2X terminals is located within the coverage of the base station and UE-2 is located outside the coverage of the base station. Specifically, FIG. 1 illustrates an example of partial coverage (PC), in which a part (UE-2) of the V2X terminals is located outside the coverage of the base station. The V2X terminal (UE-1) located within the coverage of the base station may receive data and control information from the base station via a downlink or may transmit data and control information via an uplink to the base station. The V2X terminal (UE-2) located outside the coverage of the base station may not receive data and control information via a downlink from the base station, and may not transmit data and control information via an uplink to the base station. The V2X terminal (UE-2) may transmit or receive data and control information for V2X communication to or from the V2X terminal (UE-1) via a sidelink.

Referring to FIG. 1, an example of a case 120 in which all V2X terminals are located outside the coverage of the base station (out-of-coverage, OOC) is illustrated. Therefore, the V2X terminals (UE-1 and UE-2) may not receive data and control information from the base station via a downlink, and may not transmit data and control information via an uplink to the base station. The V2X terminals (UE-1 and UE-2) may transmit or receive data and control information for V2X communication via a sidelink.

Referring to FIG. 1, an example of a scenario 130 of performing V2X communication between V2X terminals (UE-1 and UE-2) located in different cells is illustrated. Specifically, a scenario (inter-cell V2X communication), in which the V2X terminals (UE-1 and UE-2) are camping on (an RRC disconnected state, for example, an RRC idle state) or connected to (an RRC connected state) different base stations, is illustrated. The V2X terminal (UE-1) may be a V2X transmission terminal and the V2X terminal (UE-2) may be a V2X reception terminal. Alternatively, the V2X terminal (UE-1) may be a V2X reception terminal, and the V2X terminal (UE-2) may be a V2X transmission terminal. The V2X terminal (UE-1) may receive a system information block (SIB) from a base station to which the V2X terminal (UE-1) is connected (or on which the V2X terminal (UE-1) is camping), and the V2X terminal (UE-2) may receive an SIB from another base station to which the V2X terminal (UE-2) is connected (or on which the V2X terminal (UE-2) is camping). In this case, an existing SIB or an SIB defined separately for V2X may be used as the SIB. Information of the SIB received by the V2X terminal (UE-1) and information of the SIB received by the V2X terminal (UE-2) may be different from each other. Therefore, in order to perform V2X communication between the terminals (UE-1 and UE-2) located in different cells, information may needs to be unified or information thereof is signaled so that a method of interpreting SIB information transmitted from each of different cells may be additionally required.

FIG. 1 illustrates the V2X system including the V2X terminals (UE-1 and UE-2) for convenience of description, but the disclosure is not limited thereto, and communication may be performed between more V2X terminals. An interface (uplink and downlink) between a base station and V2X terminals may be referred to as a Uu interface, and a sidelink between V2X terminals may be referred to as a PC5 interface. Therefore, in the disclosure, these may be used interchangeably. In the disclosure, a terminal may include a vehicle that supports vehicle-to-vehicle (V2V) communication, a vehicle or a pedestrian handset (e.g., a smartphone) that supports vehicle-to-pedestrian (V2P) communication, a vehicle that supports vehicle-to-network (V2N) communication, or a vehicle that supports communication between a vehicle and a transportation infrastructure (vehicle-to-infrastructure (V2I) communication). In the disclosure, a terminal may include a road side unit (RSU) equipped with a terminal function, an RSU equipped with a base station function, or an RSU equipped with a part of the base station function and a part of the terminal function.

According to an embodiment, a base station may be a base station supporting both V2X communication and general cellular communication, or a base station supporting only V2X communication. The base station may be a 5G base station (next generation Node B, gNodeB, or gNB), a 4G base station (evolved Node B, eNodeB, or eNB), or an RSU. Accordingly, in this disclosure, a base station may be referred to as an RSU.

Figure 2:
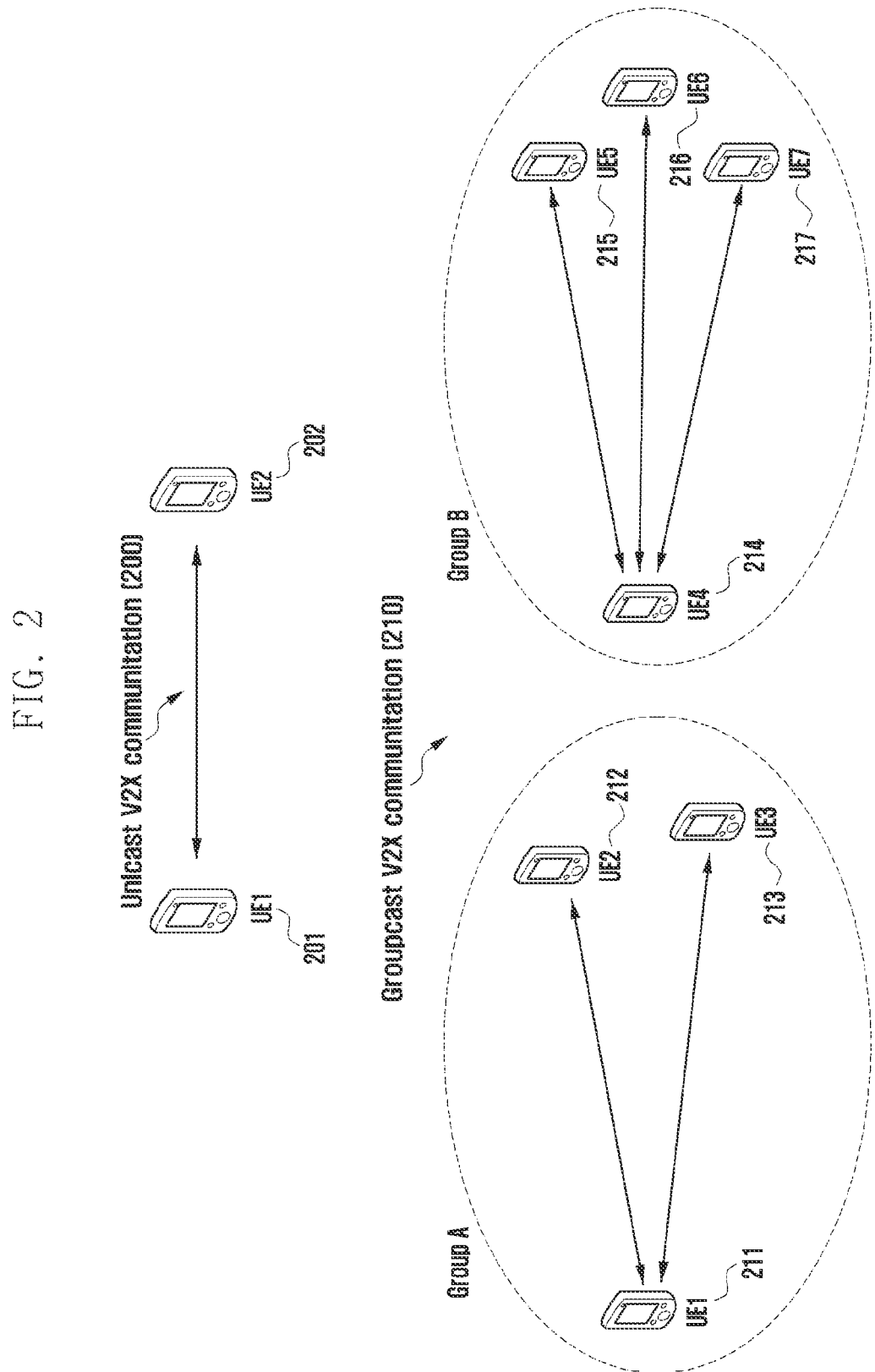
FIG. 2 illustrates a V2X communication method performed via a sidelink according to an embodiment.

FIG. 2 illustrates a V2X communication method performed via a sidelink according to an embodiment.

Referring to FIG. 2, UE-1 (e.g., a TX terminal) 201 and UE-2 (e.g., an RX terminal) 202 may perform one-to-one communication 200. This may be referred to as unicast communication.

Referring to FIG. 2, the TX terminal and the RX terminal(s) may perform one-to-many communication 210. This may be referred to as groupcast or multicast. In FIG. 2, UE-1 211, UE-2 212, and UE-3 213 may form one group (group A) to perform groupcast communication, and UE-4 214, UE-5 215, UE-6 216, and UE-7 217 may form another group (group B) to perform groupcast communication. Each terminal may perform groupcast communication only within a group to which each terminal itself belongs, and communication between different groups may be performed via unicast, groupcast, or broadcast communication. FIG. 2 illustrates that two groups (group A and group B) are formed, but the disclosure is not limited thereto.

V2X terminals may also perform broadcast communication. Broadcast communication refers to a case in which all V2X terminals receive data and control information transmitted by a V2X transmission terminal via a sidelink. For example, if it is assumed in FIG. 2 that UE-1 211 is a transmission terminal for broadcast, all terminals (UE-2 212, UE-3 213, UE-4 214, UE-5 215, UE-6 216, and UE-7 217) may receive data and control information transmitted by UE-1 211.

In NR V2X, unlike in LTE V2X, support of a form in which a vehicle terminal transmits data to only one specific node via unicast and a form in which data is transmitted to specific multiple nodes via groupcast may be considered. For example, these unicast and groupcast technologies may be usefully used in a service scenario, such as platooning, which is a technology of connecting two or more vehicles in a single network so as to move the vehicles in a cluster. Specifically, unicast communication may be required for the purpose of controlling one specific node by a leader node of a group connected by platooning, and groupcast communication may be required for the purpose of concurrently controlling a group including specific multiple nodes.

Figure 3:
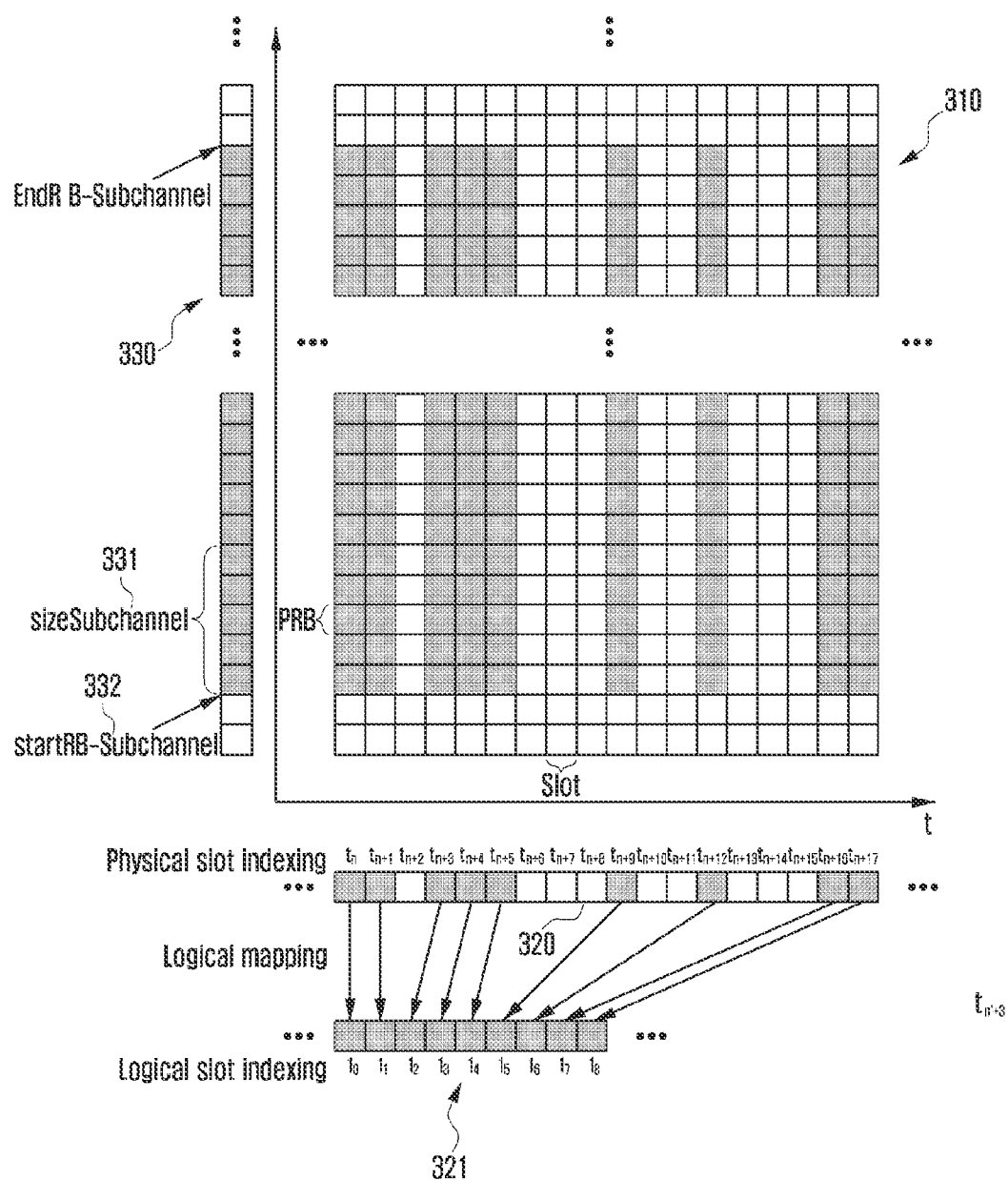
FIG. 3 illustrates a resource pool defined as a set of resources on time and frequency used for sidelink transmission and reception according to an embodiment.

FIG. 3 illustrates a resource pool defined as a set of resources on time and frequency used for sidelink transmission and reception according to an embodiment.

In a resource pool, a resource granularity of a time axis may be a slot. A resource granularity of a frequency axis may be a sub-channel including one or more physical resource blocks (PRBs).

When a resource pool is allocated in time and frequency in 310, colored areas indicate an area configured as the resource pool in time and frequency. In the disclosure, an example of a case, in which a resource pool is non-continuously allocated in time is described, but a resource pool may be continuously allocated in time. In the disclosure, an example of a case, in which a resource pool is continuously allocated in frequency is described, but a method in which a resource pool is non-continuously allocated in frequency is not excluded.

Referring to FIG. 3, a case 320 in which a resource pool is non-continuously allocated in time is illustrated. Referring to FIG. 3, a case in which resource allocation granularity in time is configured by slots. Specifically, one slot including multiple OFDM symbols may be basic resource granularity on the time axis. All OFDM symbols constituting the slot may be used for sidelink transmission, and some of the OFDM symbols constituting the slot may be used for sidelink transmission. For example, a part of the slot may be used as a downlink/uplink used as a Uu interface between a base station and a terminal. Referring to FIG. 3, a colored slot indicates a slot included in a resource pool in time, and a slot assigned to the resource pool may be (pre-)configured via resource pool information in time.

In the disclosure, (pre-)configuration may refer to configuration information pre-configured for a terminal and stored in advance, or may refer to a case in which a terminal is configured in a cell-common manner from a base station. Here, cell-common may indicate that terminals within a cell receive configurations of the same information from a base station. In this case, a method in which a terminal acquires cell-common information by receiving a sidelink system information block (SL-SIB) from a base station may be considered. Further, it may also refer to a case in which a terminal is configured in a UE-specific manner after a radio resource control (RRC) connection to a base station is established. UE-specific may be replaced with the term UE-dedicated, and may indicate that configuration information is received with a specific value for each UE. A method in which a terminal acquires UE-specific information by receiving an RRC message from a base station may be considered.

Referring to FIG. 3, a physical slot 320 belonging to a resource pool that is non-continuous in time may be mapped to a logical slot 321. In general, a set of slots belonging to a physical sidelink shared channel (PSSCH) resource pool may be represented by (t0, t1, . . . , ti, . . . , tTmax).

Referring to FIG. 3, a case 330 in which a resource pool is continuously allocated in frequency is illustrated.

On the frequency axis, resource allocation may be performed in units of sub-channels 331 within a sidelink bandwidth part (BWP). The sub-channel 331 may be defined to be resource granularity in frequency including one or more RBs. That is, the sub-channel 331 may be defined to be an integer multiple of RB. Referring to FIG. 3, the sub-channel 331 may include five continuous PRBs, and a sub-channel size (sizeSubchannel) may be a size of five continuous PRBs. The content illustrated in the drawings is merely an example of the disclosure, and a size of a sub-channel may be configured differently. It is common that one sub-channel is configured as continuous PRBs but is not necessarily configured as continuous PRBs. The sub-channel 331 may be basic resource granularity for PSSCH.

startRB-Subchannel 332 may indicate a start position of the sub-channel 331 in frequency in a resource pool. If resource allocation is performed in units of sub-channels 331 on the frequency axis, resources in frequency may be allocated via configuration information, such as an RB index (startRB-Subchannel) 332 from which the sub-channel 331 starts, information (sizeSubchannel) on the number of RBs constituting the sub-channel 331, and the total number (numSubchannel) of sub-channels 331. Information on startRB-Subchannel, sizeSubchannel, and numSubchannel may be (pre-)configured via resource pool information in frequency.

Figure 4:
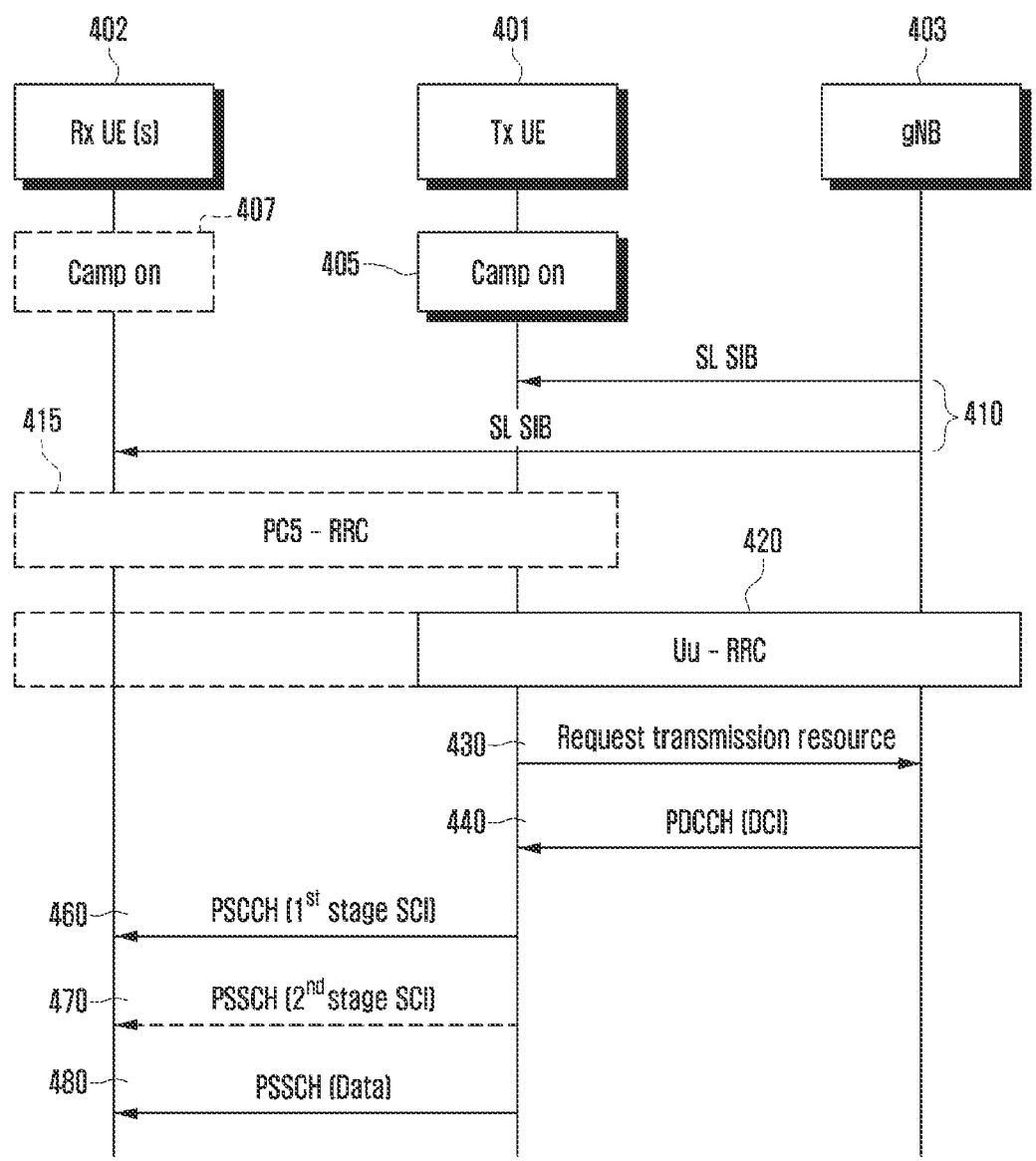
FIG. 4 illustrates a sequence diagram of a method for allocating a transmission resource in a sidelink by a base station according to an embodiment.

FIG. 4 illustrates a sequence diagram of a method for allocating a transmission resource in a sidelink by a base station according to an embodiment.

A method for allocating a transmission resource by a base station in a sidelink will be referred to as mode 1. Mode 1 may be scheduled resource allocation. Mode 1 may indicate a method in which a base station allocates resources used for sidelink transmission to RRC-connected terminals in a dedicated scheduling scheme. The method of mode 1 may be effective for interference management and resource pool management because a base station can manage sidelink resources.

Referring to FIG. 4 a transmission terminal 401 may camp on 405 a base station (cell) 403. The camp on may refer to, for example, a state in which a terminal in a standby state (RRC_IDLE) may select (or reselect) a base station (cell) as needed and receive system information or paging information, etc.

If a reception terminal 402 is located within coverage of the base station (cell) 403, the reception terminal 402 may camp on 407 the base station (cell) 403. On the other hand, if the reception terminal 402 is located outside the coverage of the base station (cell) 403, the reception terminal 402 may not camp on the base station (cell) 403.

In the disclosure, the reception terminal 402 represents a terminal receiving data transmitted by the transmission terminal 401.

The transmission terminal 401 and the reception terminal 402 may receive a sidelink system information block (SL-SIB) from the base station 403 in 410. The SL-SIB information may include sidelink resource pool information for sidelink transmission or reception, parameter configuration information for sensing operation, information for configuring sidelink synchronization, carrier information for sidelink transmission or reception operating at different frequencies, or the like.

If data traffic for V2X is generated in the transmission terminal 401, the transmission terminal 401 may be RRC-connected to the base station 403 in 420. The RRC connection between the terminal and the base station may be referred to as Uu-RRC. A Uu-RRC connection procedure 420 may be performed prior to data traffic generation of the transmission terminal 401. In mode 1, the transmission terminal may perform transmission to the reception terminal via a sidelink in a state where the Uu-RRC connection procedure 420 between the base station 403 and the reception terminal 402 is performed. On the other hand, in mode 1, the transmission terminal may perform transmission to the reception terminal via a sidelink even in a state where the Uu-RRC connection procedure 420 between the base station 403 and the reception terminal 402 is not performed.

The transmission terminal 401 may request, from the base station in 430, a transmission resource enabling V2X communication with the reception terminal 402. The transmission terminal 401 may request a sidelink transmission resource from the base station 403 by using a physical uplink control channel (PUCCH), an RRC message, or a medium access control (MAC) control element (CE). The MAC CE may be a buffer status report (BSR) MAC CE of a new format (at least including information on an indicator indicating a buffer status report for V2X communication and information on a size of data buffered for D2D communication), etc. The transmission terminal 401 may request a sidelink resource via a scheduling request (SR) bit transmitted through the physical uplink control channel.

Next, the base station 403 may allocate a V2X transmission resource to the transmission terminal 401. The base station may allocate the transmission resource in a dynamic grant or configured grant scheme.

First, in a case of the dynamic grant scheme, the base station may allocate a resource for TB transmission via downlink control information (DCI). Sidelink scheduling information included in the DCI may include parameters related to transmission time point and frequency allocation position information fields of initial transmission and retransmission. DCI for the dynamic grant scheme may be cyclic redundancy check (CRC) scrambled with sidelink V2X radio network temporary identifier (SL-V-RNTI) so as to indicate the dynamic grant scheme.

Subsequently, in a case of the configured grant scheme, the base station may periodically allocate a resource for TB transmission by configuring a semi-persistent scheduling (SPS) interval via Uu-RRC. The base station may allocate a resource for one TB via DCI. The sidelink scheduling information for one TB included in DCI may include parameters related to transmission time point and frequency allocation position information of initial transmission and retransmission resources. If a resource is allocated in the configured grant scheme, a transmission time point (occasion) and a frequency allocation position of initial transmission and retransmission for one TB may be determined by the DCI, and a resource for a subsequent TB may be repeated at SPS intervals. DCI for the configured grant scheme may be CRC scrambled with SL-SPS-V-RNTI so as to indicate the dynamic grant scheme. The configured grant (CG) scheme may be classified into type1 CG and type2 CG. In a case of type2 CG, a resource configured by the configured grant via DCI may be activated/deactivated.

Therefore, in a case of mode 1, the base station 403 may indicate scheduling for sidelink communication with the reception terminal 402 to the transmission terminal 401 via DCI transmission through a physical downlink control channel (PDCCH) in 440.

Specifically, there may be DCI format 3_0 or DCI format 3_1 for downlink control information (DCI) used by the base station 403 for sidelink communication for the transmission terminal 401. DCI format 3_0 may be defined as DCI for scheduling of an NR sidelink in one cell, and DCI format 3_1 may be defined as DCI for scheduling of an LTE sidelink in one cell.

In a case of broadcast transmission, the transmission terminal 401 may perform transmission without an RRC configuration 415 for a sidelink. Contrary to this, in a case of unicast or groupcast transmission, the transmission terminal 401 may perform RRC connection with another terminal on a one-to-one basis. In distinction from Uu-RRC, the RRC connection between terminals may be referred to as PC5-RRC in 415. In the case of groupcast, PC5-RRC 415 may be individually connected between terminals in a group. Referring to FIG. 4, although the connection of PC5-RRC 415 is illustrated as an operation after transmission of the SL-SIB in 410, it may be performed at any time before transmission of the SL-SIB in 410 or before transmission of SCI.

Subsequently, the transmission terminal 401 may transmit SCI ($1^{st}$ stage) to the reception terminal 402 through a physical sidelink control channel (PSCCH) in 460. Also, the transmission terminal 401 may transmit SCI ($2^{nd}$ stage) to the reception terminal 402 through a PSSCH in 470. $1^{st}$ stage SCI may include information related to resource allocation, and $2^{nd}$ stage SCI may include other control information. Also, the transmission terminal 401 may transmit data to the reception terminal 402 through the PSSCH in 480. The SCI ($1^{st}$ stage), SCI ($2^{nd}$ stage), and the PSSCH may be transmitted together in the same slot.

Figure 5:
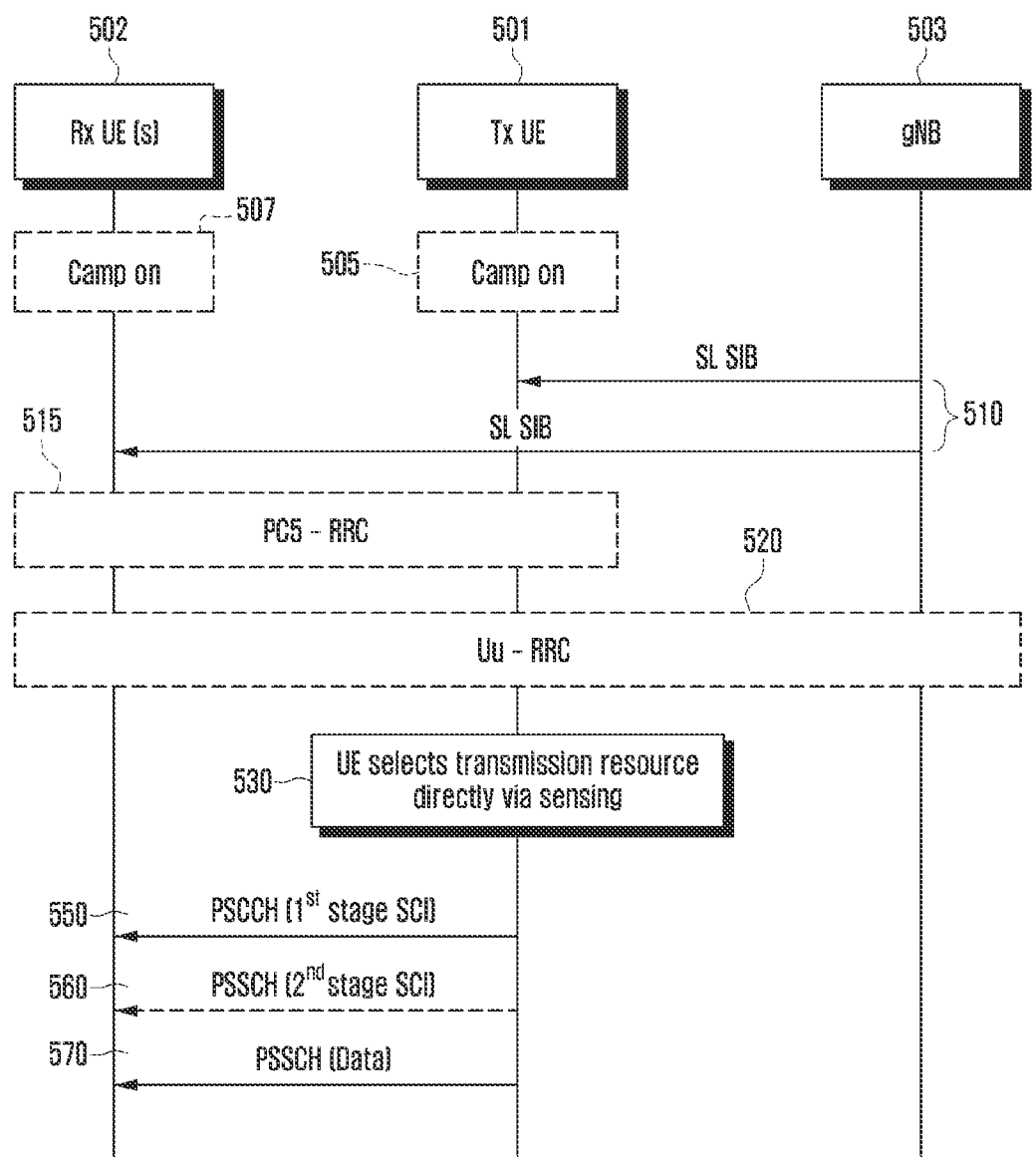
FIG. 5 illustrates a sequence diagram of a method for directly allocating a sidelink transmission resource via sensing by a terminal in a sidelink according to an embodiment.

FIG. 5 is a sequence diagram illustrates a sequence diagram of a method for directly allocating a sidelink transmission resource via sensing by a terminal in a sidelink according to an embodiment.

Hereinafter, a method in which a terminal directly allocates a transmission resource of a sidelink via sensing in the sidelink, will be referred to as mode 2. Mode 2 may also be referred to as UE autonomous resource selection. In mode 2, a base station 503 may provide a sidelink transmission/reception resource pool for V2X as system information, and a transmission terminal 501 may select a transmission resource according to a determined rule. Unlike mode 1 in which a base station directly participates in resource allocation, there is a difference in FIG. 5 in that the transmission terminal 501 autonomously selects a resource and transmits data, based on a resource pool received in advance via system information.

Referring to FIG. 5, a transmission terminal 501 may camp on 505 a base station (cell) 503. The camp on may refer to, for example, a state in which a terminal in a standby state (RRC_IDLE) may select (or reselect) a base station (cell) as needed and receive system information or paging information, etc. Referring to FIG. 5, unlike FIG. 4, in the case of mode 2, if the transmission terminal 501 is located within coverage of the base station (cell) 503, the transmission terminal 501 may camp on 507 the base station (cell) 503. On the other hand, if the transmission terminal 501 is located outside the coverage of the base station (cell) 503, the transmission terminal 501 may not camp on the base station (cell) 503.

If a reception terminal 502 is located within the coverage of the base station (cell) 503, the reception terminal 502 may camp on 507 the base station (cell) 503. On the other hand, if the reception terminal 502 is located outside the coverage of the base station (cell) 503, the reception terminal 502 may not camp on the base station (cell) 503.

In the disclosure, the reception terminal 502 represents a terminal receiving data transmitted by the transmission terminal 501.

The transmission terminal 501 and the reception terminal 502 may receive a sidelink system information block (SL-SLB) from the base station 503 in 510. The SL-SIB information may include sidelink resource pool information for sidelink transmission or reception, parameter configuration information for sensing operation, information for configuring sidelink synchronization, carrier information for sidelink transmission or reception operating at different frequencies, or the like.

A difference between FIG. 4 and FIG. 5 is that the base station 503 and the terminal 501 operate in an RRC connected state in FIG. 4, whereas the terminal may operate also in an idle mode 520 (an RRC disconnected state) in FIG. 5. Even in the RRC connected state 520, the base station 503 may allow, without directly participating in resource allocation, the transmission terminal 501 to autonomously select a transmission resource. The RRC connection between the terminal 501 and the base station 503 may be referred to as Uu-RRC 520. When data traffic for V2X is generated in the transmission terminal 501, the transmission terminal 501 may be configured with a resource pool via system information received from the base station 503, and the transmission terminal 501 may directly select, in 530, a resource of a time/frequency domain via sensing within the configured resource pool. When a resource is finally selected, the selected resource is determined as a grant for sidelink transmission.

In a case of broadcast transmission, the transmission terminal 501 may perform transmission without an RRC configuration 515 for a sidelink. Contrary to this, in a case of unicast or groupcast transmission, the transmission terminal 501 may perform RRC connection with another terminal on a one-to-one basis. In distinction from Uu-RRC 520, the RRC connection between terminals may be referred to as PC5-RRC in 515. In the case of groupcast, PC5-RRC 515 may be individually connected between terminals in a group. Referring to FIG. 5, although the connection of PC5-RRC 515 is illustrated as an operation after transmission of the SL-SIB in 510, it may be performed at any time before transmission of the SL-SIB in 510 or before transmission of SCI.

Subsequently, the transmission terminal 501 may transmit SCI ($1^{st}$ stage) to the reception terminal 502 through a PSSCH in 550. Also, the transmission terminal 501 may transmit SCI ($2^{nd}$ stage) to the reception terminal 502 through the PSSCH in 560. $1^{st}$ stage SCI may include information related to resource allocation, and $2^{nd}$ stage SCI may include other control information. Also, the transmission terminal 501 may transmit data to the reception terminal 502 through the PSSCH in 570. The SCI ($1^{st}$ stage), SCI ($2^{nd}$ stage), and the PSSCH may be transmitted together in the same slot.

Specifically, the sidelink control information (SCI) used by the transmission terminals 401 and 501 for sidelink communication to the reception terminals 402 and 502 is SCI ($1^{st}$ stage) and may include SCI format 1-A. Also, the SCI is SCI ($2^{nd}$ stage) and may include SCI format 2-A or SCI format 2-B. In SCI ($2^{nd}$ stage), if HARQ feedback is not used, or if HARQ feedback is used and both ACK and NACK information is included, SCI format 2-A may include information for PSSCH decoding so as to be used. On the other hand, if HARQ feedback is not used, or if HARQ feedback is used and only NACK information is included, SCI format 2-B may include information for PSSCH decoding so as to be used. For example, SCI format 2-B may be limitedly used for groupcast transmission.

Figure 6A:
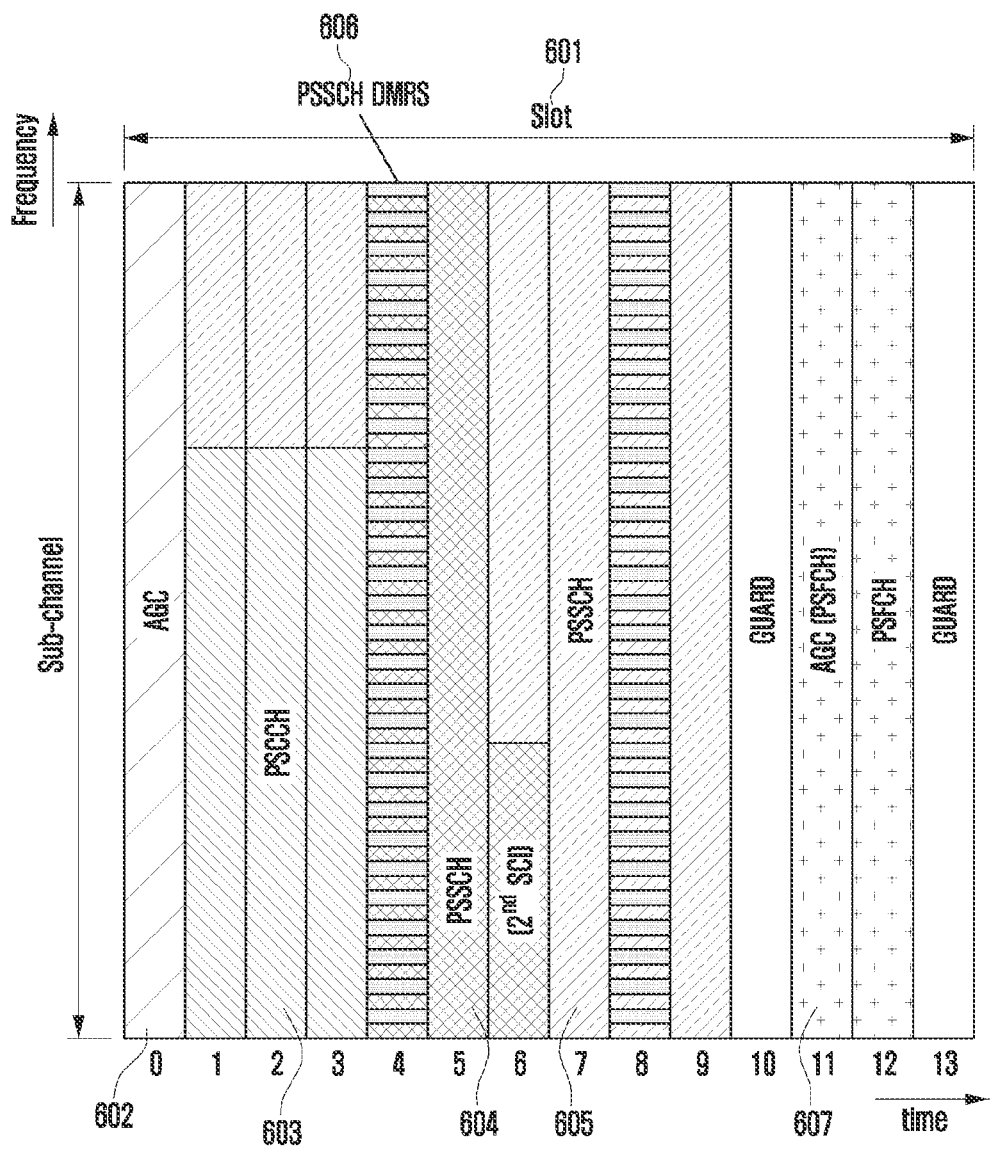
FIG. 6A illustrates a mapping structure of physical channels mapped to one slot in which no PSFCH resource is configured in a sidelink according to an embodiment.
Figure 6B:
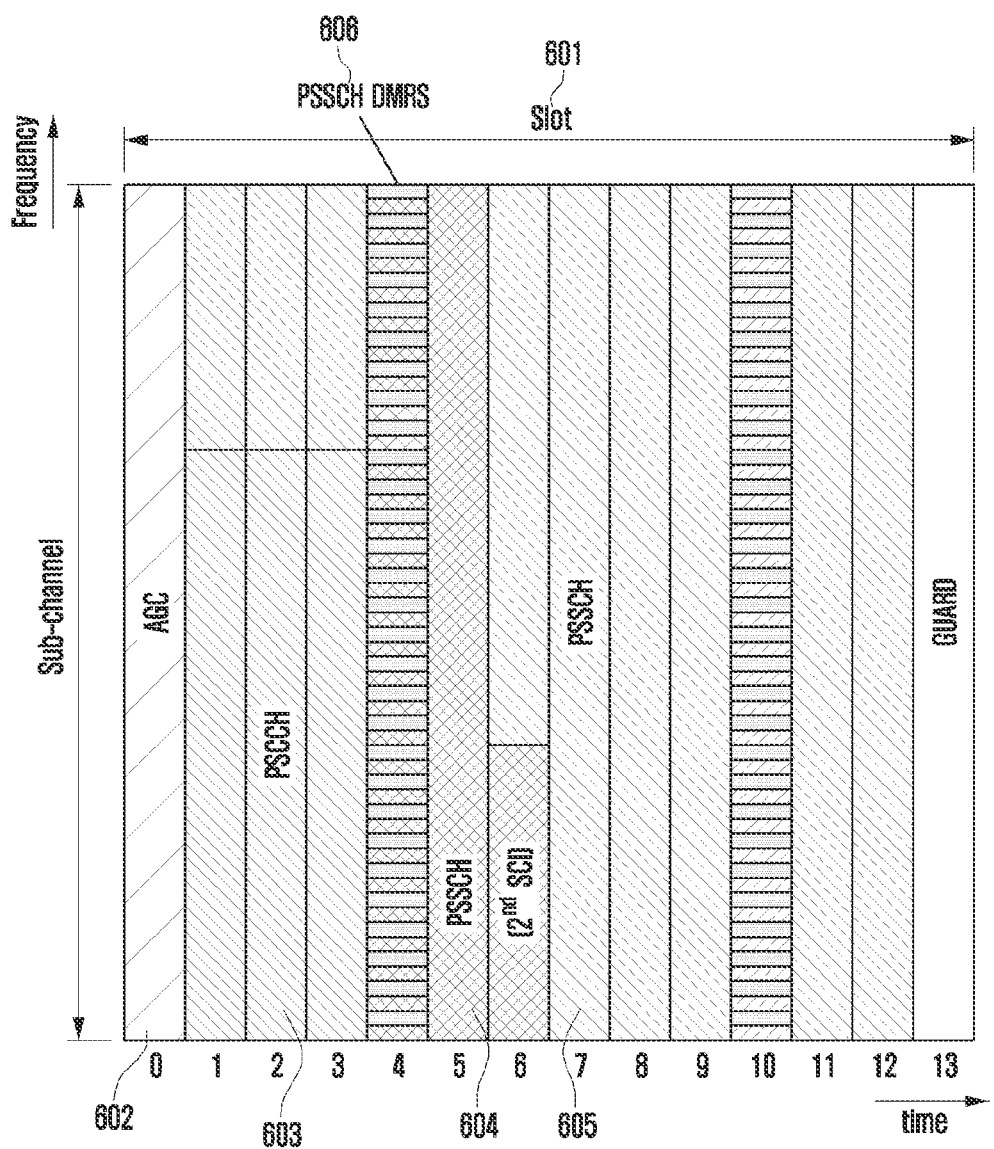
FIG. 6B illustrates a mapping structure of physical channels mapped to one slot in which a PSFCH resource is configured in a sidelink according to an embodiment.

FIG. 6A illustrates a mapping structure of physical channels mapped to one slot in which no physical sidelink feedback channel (PSFCH) resource is configured in a sidelink according to an embodiment of the disclosure, and FIG. 6B is a diagram illustrating a mapping structure of physical channels mapped to one slot in which a PSFCH resource is configured in a sidelink according to an embodiment.

Specifically, mapping to PSCCH/PSSCH/PSFCH physical channels is illustrated in FIG. 6A and FIG. 6B. In a case of a PSFCH, when HARQ feedback of a sidelink is activated in a higher layer, a time resource of the PSFCH may be (pre-)configured via resource pool information. The time resource in which the PSFCH is transmitted may be (pre-) configured to one value of every 0, 1, 2, and 4 slots. Here, "0" indicates that no PSFCH resource is used. 1, 2, and 4 may indicate that a PSFCH resource is transmitted in every 1, 2, and 4 slots, respectively. A structure of a slot in which no PSFCH resource is configured is illustrated in FIG. 6A, and a structure of a slot in which a PSFCH resource is configured is illustrated in FIG. 6B. A PSCCH/PSSCH/PSFCH may be assigned to one or more sub-channels in frequency. A method for sub-channel allocation has been described in FIG. 3 and its corresponding description.

Subsequently, referring to FIG. 6A and FIG. 6B in order to describe mapping in time for PSCCH/PSSCH/PSFCH, one or more symbols before a transmission terminal transmits the PSCCH/PSSCH/PSFCH in a corresponding slot 601 may be used as an area 602 for automatic gain control (AGC). When the corresponding symbol(s) is used for AGC, a method of repetitively transmitting a signal of another channel in a corresponding symbol area may be considered. A part of a PSCCH symbol or PSSCH symbol may be considered for a repetitive signal of another channel. Alternatively, a preamble may be transmitted in the AGC area. When a preamble signal is transmitted, it is advantageous that an AGC execution time may be further shortened compared to a method of repetitively transmitting a signal of another channel. When a preamble signal is transmitted for AGC, a specific sequence may be used as the preamble signal 602, and in this case, a sequence, such as a PSSCH demodulation reference signal (DMRS), a PSCCH DMRS, and a channel state information reference signal (CSI-RS), may be used as the preamble. In the disclosure, a sequence used as a preamble is not limited to the above-described example.

Additionally, according to FIG. 6A and FIG. 6B, control information related to resource allocation to initial symbols of the slot may be transmitted on a PSCCH 603 as $1^{st}$ stage sidelink control information (SCI), and other control information may be transmitted in an area 604 of PSSCH as $2^{nd}$ stage SCI. Data scheduled by the control information may be transmitted on a PSSCH 605. In this case, a position in time at which the $2^{nd}$ stage SCI is transmitted may be mapped from a symbol in which a first PSSCH DMRS 606 is transmitted. The position in time at which the PSSCH DMRS 606 is transmitted may vary in a slot in which the PSFCH is transmitted and a slot in which no PSFCH is transmitted, as illustrated in FIG. 6A and FIG. 6B. FIG. 6A illustrates that a PSFCH 607, which is a physical channel for transmission of feedback information, is located in the last part of the slot. By securing a predetermined vacant time (Guard) between the PSSCH 605 and the PSFCH 607, a terminal having transmitted or received the PSSCH 605 may prepare to transmit or receive the PSFCH 607. After transmission or reception of the PSFCH 607, a period (Guard) vacant for a predetermined time may be secured.

Figure 7A:
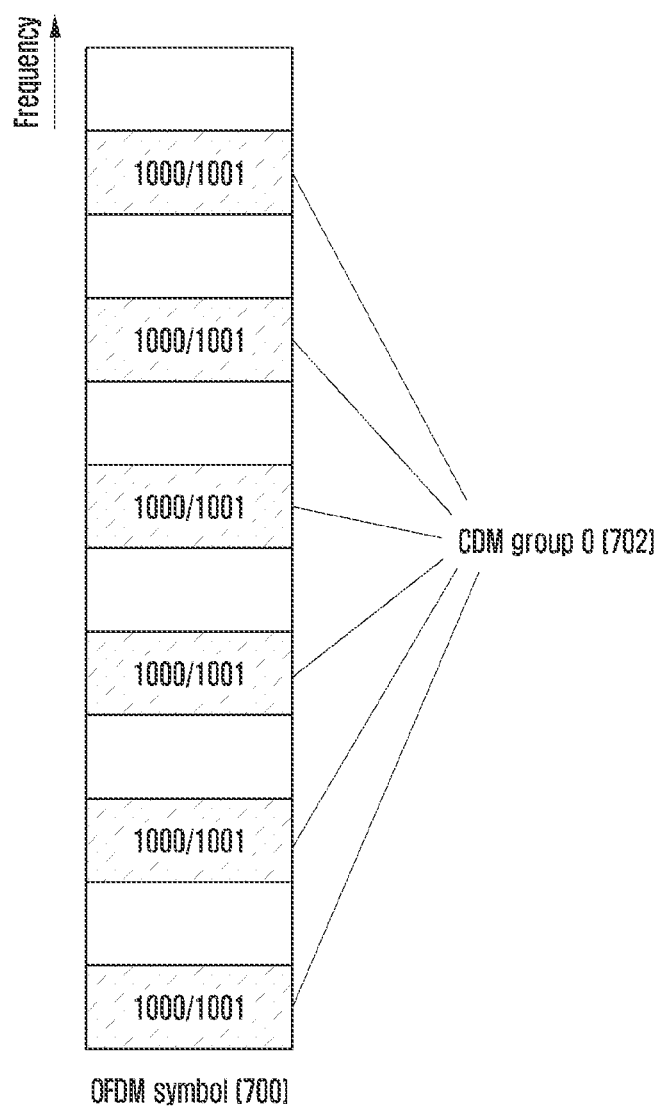
FIG. 7A illustrates a pattern of a PSSCH DMRS using one CDM group in a sidelink according to an embodiment.
Figure 7B:
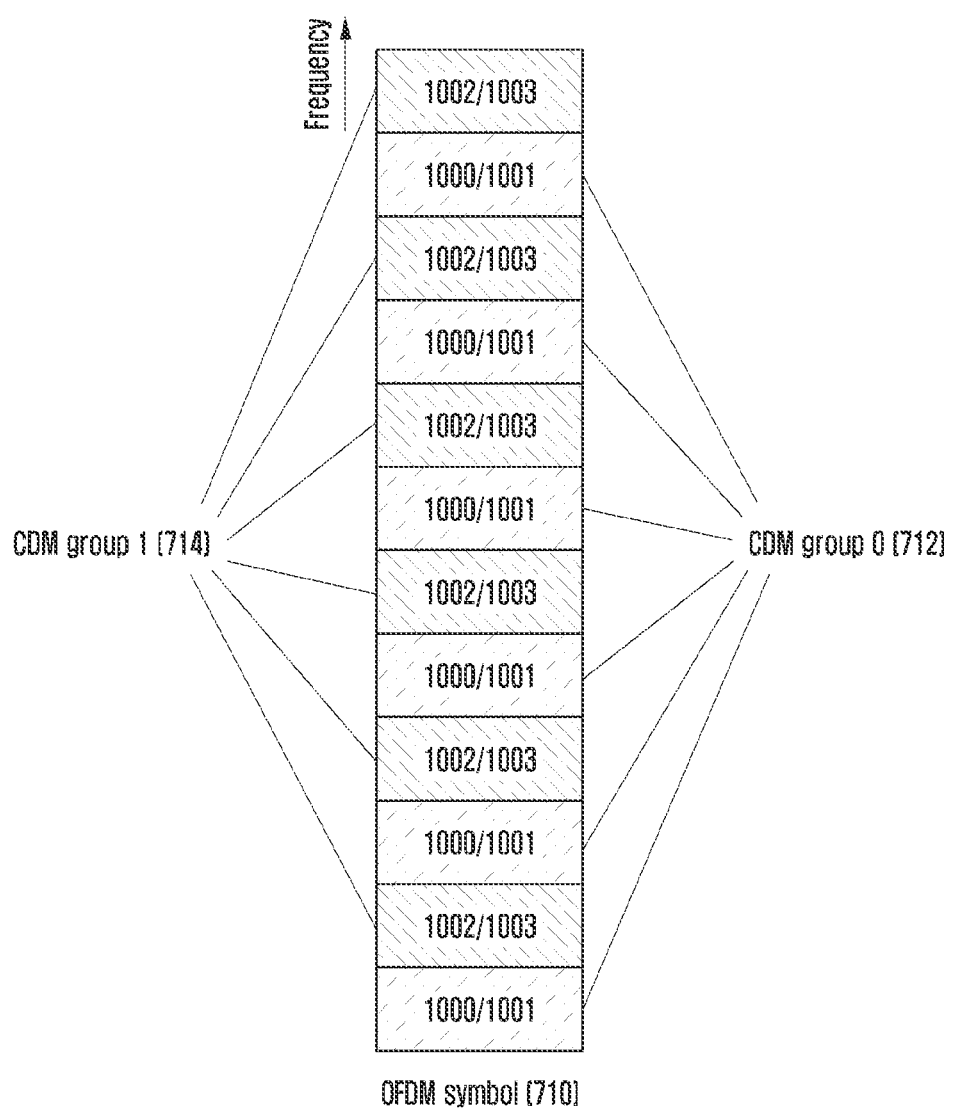
FIG. 7B illustrates a pattern of a PSSCH DMRS using two CDM groups in a sidelink according to an embodiment.

FIG. 7A illustrates a pattern of a PSSCH DMRS using one CDM group in a sidelink according to an embodiment, and FIG. 7B illustrates a pattern of a PSSCH DMRS using two CDM groups in a sidelink according to an embodiment.

In FIG. 7A and FIG. 7B, a code division multiplexing (CDM) group may refer to a group in which one or more DMRS ports (e.g., port numbers 1000 and 1001 or port numbers 1002 and 1003) are transmitted orthogonally via CDM at a resource element (RE) position in the same frequency. The disclosure is not limited to frequency and time patterns of a PSSCH DMRS according to FIG. 7A, FIG. 7B, and Table 1. In the disclosure, the DMRS port number is merely an example for convenience of description and a different port number may be defined.

Referring to FIG. 7A, illustrated is an example of a DMRS pattern in frequency using one CDM group according to an embodiment. Specifically, FIG. 7A illustrates an example in which, in one CDM group "0" 702 in a specific OFDM symbol 700, DMRS ports 1000 and 1001 are mapped to REs in a resource block (RB) in frequency so as to be transmitted.

Referring to FIG. 7B, illustrated is an example of a DMRS pattern in frequency using two CDM groups according to an embodiment. Specifically, FIG. 7B illustrates an example in which two CDM groups are transmitted in a specific OFDM symbol 710, wherein, for CDM group "0" 712 that is one of the two CDM groups, DMRS ports 1000 and 1001 are mapped to REs in a resource block (RB) in frequency so as to be transmitted, and for CDM group "1" 714 that is the other of the two CDM groups, DMRS ports 1002 and 1003 are mapped to REs in the RB in frequency so as to be transmitted.

Table 1 below shows an example in which the PSSCH DMRS patterns in frequency described with reference to FIG. 7A and FIG. 7B are mapped to symbols in the time slot for transmission.

TABLE 1

| | DM-RS position | | | | | |
|---|---|---|---|---|---|---|
| Symbol | PSCCH duration 2 symbols Number of PSSCH DM-RS | | | PSCCH duration 3 symbols Number of PSSCH DM-RS | | |
| duration | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 13 | 3, 10 | 1, 6, 11 | 1, 4, 7, 10 | 4, 10 | 1, 6, 11 | 1, 4, 7, 10 |

Referring to Table 1, a method in which a PSSCH DMRS pattern in frequency is mapped to a symbol in a time slot is determined by the number of symbols in a slot used for sidelink transmission, a PSCCH symbol duration, and the number of PSSCH DMRS symbols transmitted in the slot. Specifically, the number of symbols in the slot used for sidelink transmission may be determined by a start position and length of a symbol in which a sidelink is transmitted in the slot, and corresponding information may be (pre-)configured as bandwidth part (BWP) information.

Accordingly, the number of symbols in the slot used for sidelink transmission may be determined in the range of 7 to 14, and the symbol duration in Table 1 indicates a symbol duration excluding the last symbol used as GUARD from the configured number of symbols in the slot used for sidelink transmission, as described in FIG. 6.

The symbol duration of the PSCCH may be (pre-)configured via resource pool information. Specifically, the corresponding information may be configured in a resource pool as information of the PSCCH and may be configured to be 2 or 3 as shown in Table 1. Finally, the number of PSSCH DMRS symbols transmitted in the slot may be determined as PSSCH DMRS pattern information in time, and the information may be (pre-)configured via resource pool information. Specifically, the information may be configured in the resource pool as PSSCH DMRS pattern information in time and may be configured to be {2}, {3}, {4}, {2, 3}, {2, 4}, {3, 4}, or {2, 3, 4}. When one or more pieces of PSSCH DMRS pattern information in time are configured, a transmission terminal may select one thereof and transmit the selected information via SCI. Therefore, the number of PSSCH DMRS symbols shown in Table 1 is the number of PSSCH DMRS symbols that the terminal selects and transmits via SCI, and a corresponding value may be determined to be 2, 3, or 4.

Figure 8A:
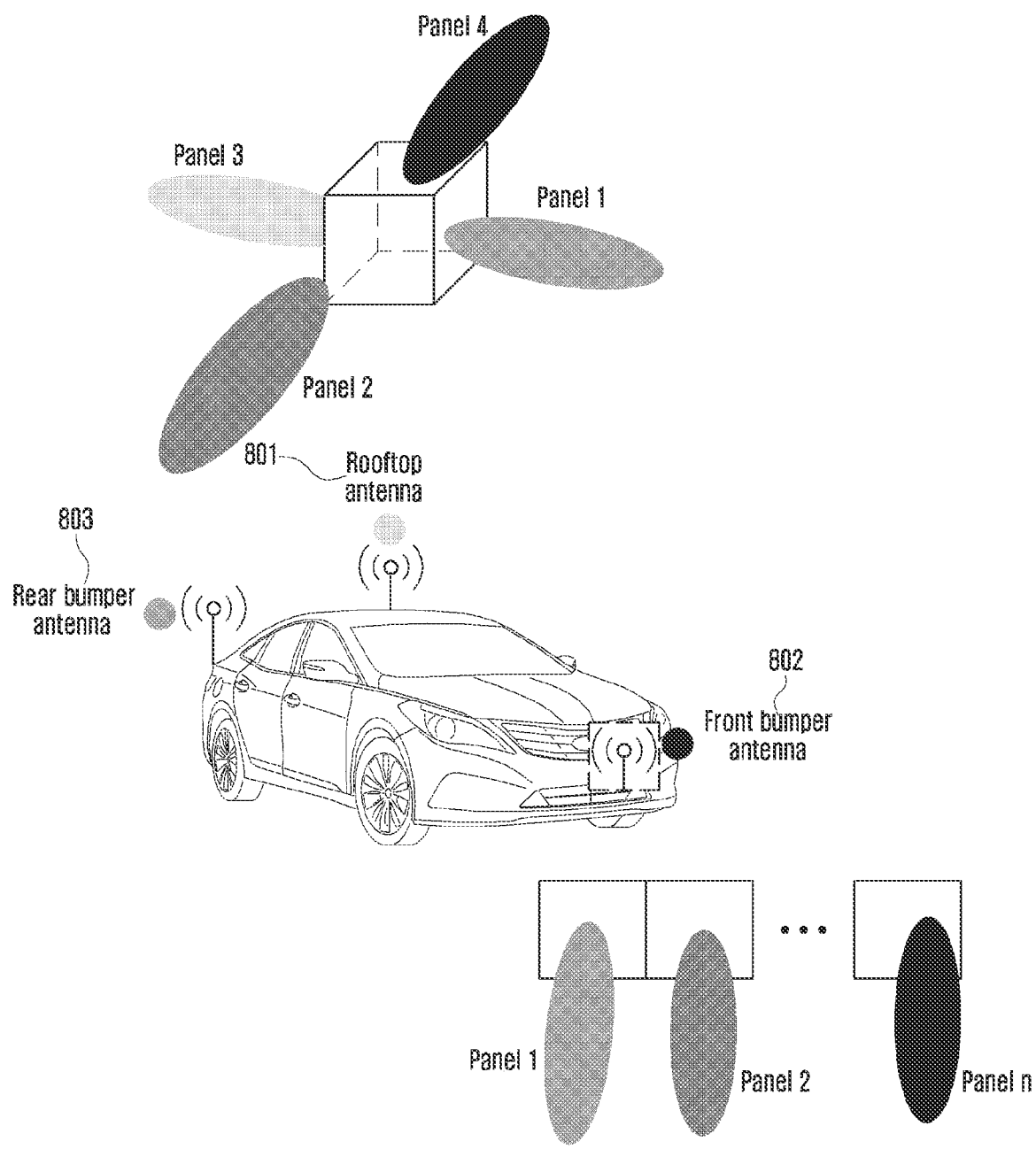
FIG. 8A illustrates an antenna structure of a vehicle terminal according to an embodiment.
Figure 8B:
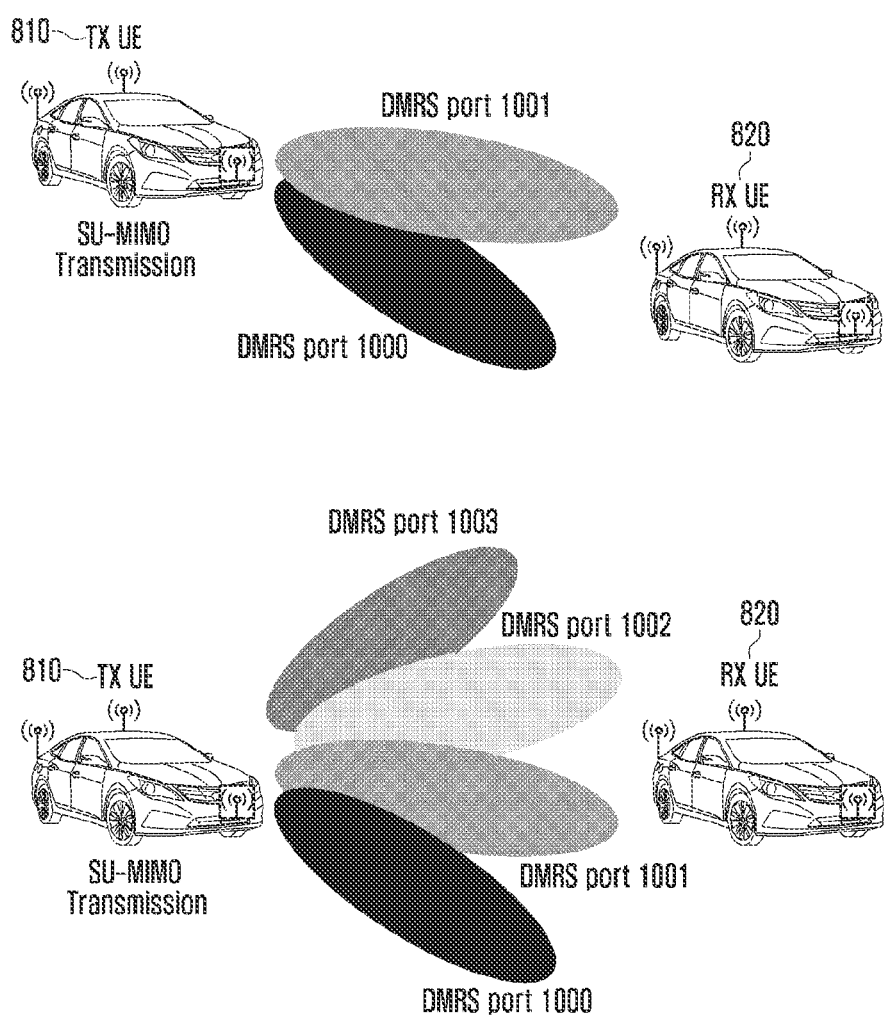
FIG. 8B illustrates a PSSCH DMRS port assignment when the vehicle terminal performs SU-MIMO transmission via a sidelink according to an embodiment.
Figure 8C:
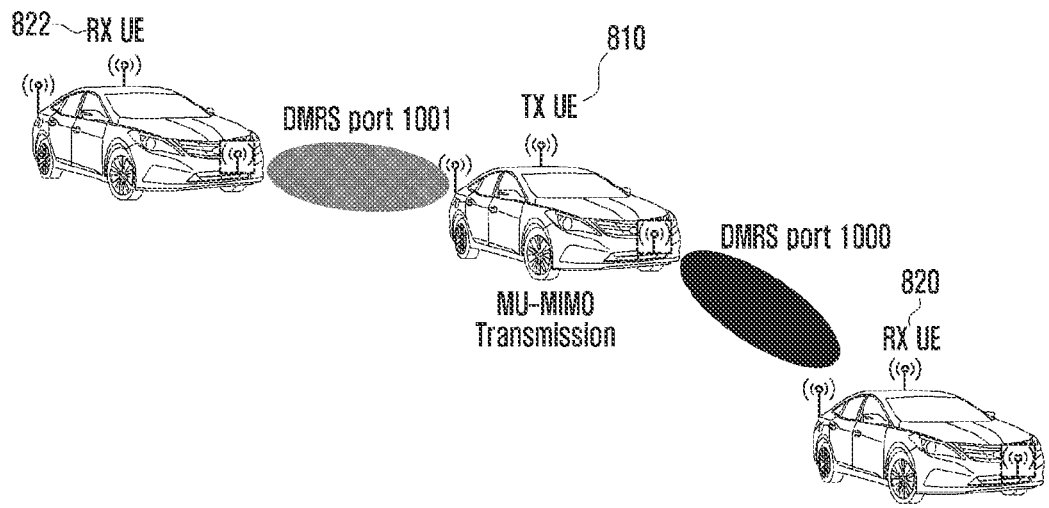
FIG. 8C illustrates a PSSCH DMRS port assignment when the vehicle terminal performs MU-MIMO transmission via a sidelink according to an embodiment.
Figure 8C:
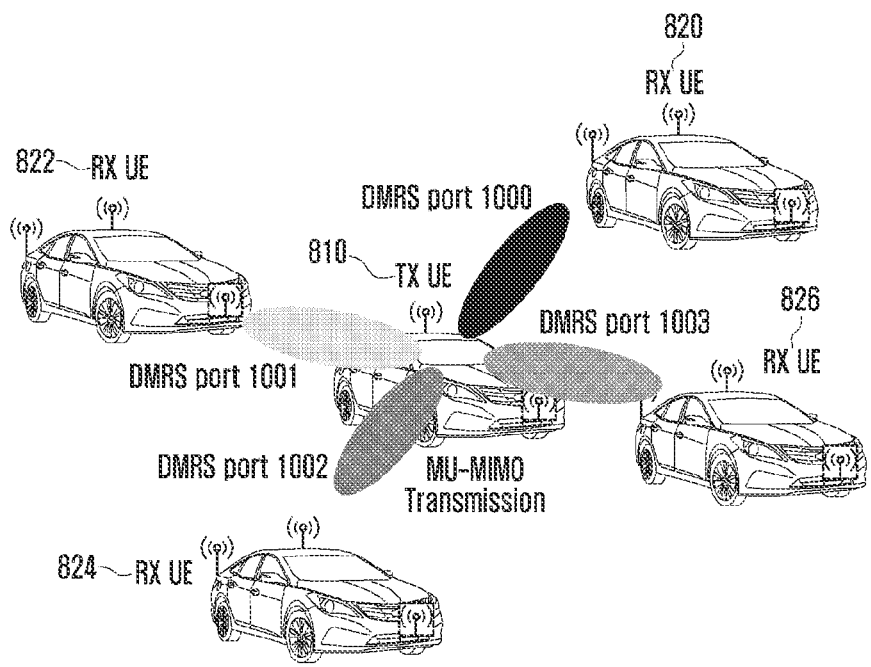
Figure 8D:
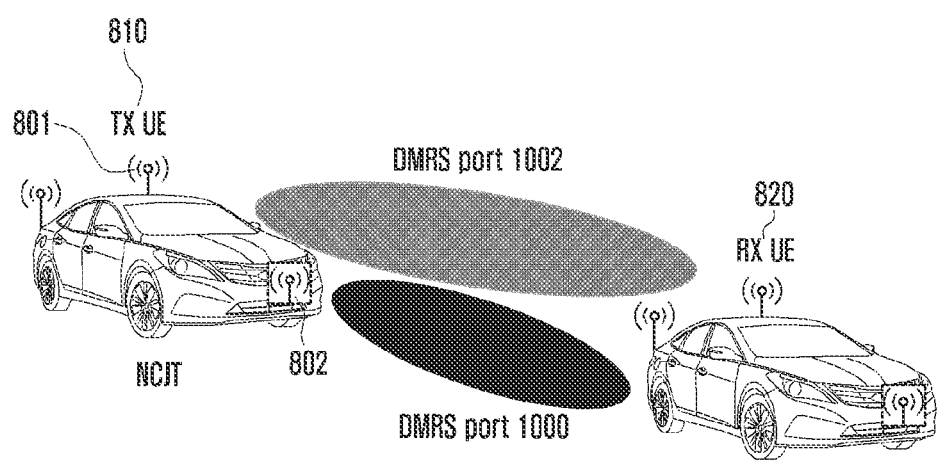
FIG. 8D illustrates a PSSCH DMRS port assignment when the vehicle terminal performs NCJT transmission via a sidelink according to an embodiment.
Figure 8D:
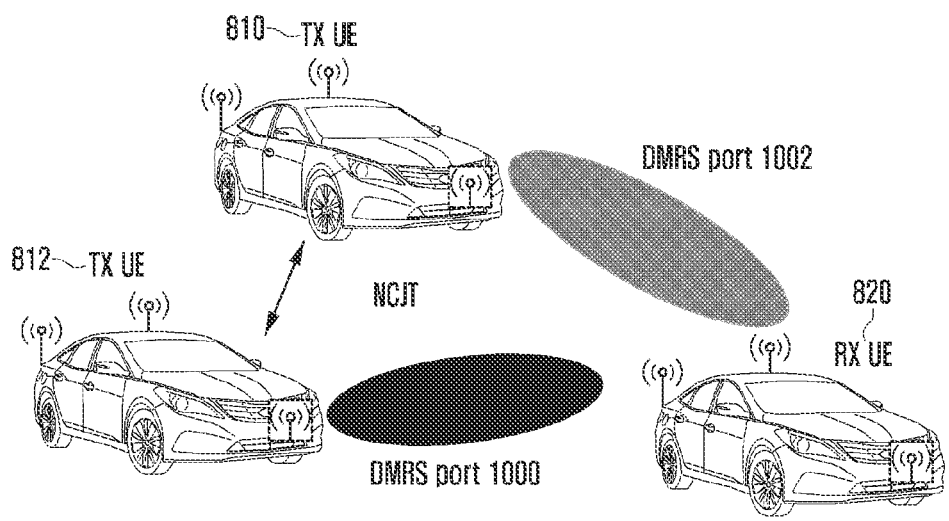

FIG. 8A illustrates an antenna structure of a vehicle terminal according to an embodiment, FIG. 8B illustrates a PSSCH DMRS port assignment when the vehicle terminal performs SU-MIMO transmission via a sidelink according to an embodiment, FIG. 8C illustrates a PSSCH DMRS port assignment when the vehicle terminal performs MU-MIMO transmission via a sidelink according to an embodiment, and FIG. 8D illustrates a PSSCH DMRS port assignment when the vehicle terminal performs NCJT transmission via a sidelink according to an embodiment.

In the disclosure, the methods for antenna structure and multi-antenna transmission of a vehicle terminal, illustrated in FIG. 8A to FIG. 8D, are merely examples for the convenience of description, and the scope of the disclosure is not limited thereto.

Referring to FIG. 8A, an example of an antenna structure of a vehicle terminal is illustrated. An antenna 801 may be installed on a rooftop of a vehicle terminal. An antenna 802 may be installed on a front bumper of the vehicle terminal. An antenna 803 may be installed on a rear bumper of the vehicle terminal. In addition to the above-listed positions, antennas may be configured in various positions of the vehicle terminal.

An example of a multi-panel antenna structure when the antenna 801 is installed on the rooftop of the vehicle terminal is illustrated. When the multi-panel antenna 801 is installed on the rooftop of the vehicle terminal, beam formation in various directions may be possible by installing respective antenna panels in various directions (for example, respective antenna panels may be installed in four directions of north, south, west, and east) as illustrated.

An example of a multi-panel antenna structure when the antenna 802 is installed in the front bumper of the vehicle terminal or an antenna 803 is installed in the rear bumper of the vehicle terminal is illustrated. If the multi-panel antenna 802 is installed in the front bumper of the vehicle terminal or the multi-panel antenna 803 is installed in the rear bumper of the vehicle terminal, respective antenna panels may be installed in a row as illustrated.

Referring to FIG. 8B, an example of PSSCH DMRS port assignment when the vehicle terminal performs SU-MIMO transmission via a sidelink is illustrated. SU-MIMO in the sidelink is a method of performing MIMO transmission or reception between one transmission terminal 810 and one reception terminal 820. The upper part of FIG. 8B illustrates an example in which PSSCH DMRS port numbers 1000 and 1001 are assigned and 2-layer SU-MIMO transmission is performed. The lower part of FIG. 8B illustrates an example in which PSSCH DMRS port numbers 1000 to 1003 are assigned and 4-layer SU-MIMO transmission is performed.

Referring to FIG. 8C, an example of PSSCH DMRS port assignment when the vehicle terminal performs MU-MIMO transmission via a sidelink is illustrated. MU-MIMO is a method of performing MIMO transmission or reception between one transmission terminal 810 and multiple reception terminals 820, 822, 824, and 826. The upper part of FIG.

8C illustrates an example in which PSSCH DMRS port numbers 1000 and 1001 are assigned for transmission or reception to or from two different terminals, respectively, so that 2-layer MU-MIMO transmission is performed. As illustrated, interference of MU-MIMO transmission may be minimized by forming a beam via each different antenna panel (e.g., different antenna panels installed on the front and rear bumpers, respectively) of the vehicle terminal. The lower part of FIG. 8C illustrates an example in which PSSCH DMRS port numbers 1000 to 1003 are assigned for transmission or reception to or from four different terminals, respectively, so that 4-layer MU-MIMO transmission is performed. As illustrated, interference of MU-MIMO transmission may be minimized by forming beams in multiple different directions via the multi-panel antenna (e.g., the multi-panel antenna installed on the rooftop of a vehicle terminal) of the vehicle terminal. In this way, a more suitable MU-MIMO transmission environment may be generated in a sidelink by the antenna structure installed in the vehicle terminal.

Referring to FIG. 8D, an example of PSSCH DMRS port assignment when the vehicle terminal performs NCJT transmission via a sidelink is illustrated. Unlike coherent joint transmission (CJT) that is transmission in synchronization at different transmission points in multi-antenna transmission, in an environment where CJT transmission is difficult, such as multiple transmission reception points (multi-TRP) and a multi-panel, NCJT that enables transmission without synchronization may be considered. Here, without synchronization may refer to that phases of signals transmitted from different transmission points are not the same.

FIG. 8D illustrates an example in which PSSCH DMRS port numbers 1000 and 1002 are assigned and NCJT transmission is performed in two layers. Unlike the aforementioned SU-MIMO or MU-MIMO transmission, in the case of NCJT transmission, for PSSCH DMRS port assignment, it is necessary to assign DMRS ports belonging to different CDM groups. Because DMRS ports belonging to the same CDM group should be distinguished via CDM, wherein, when NCJT transmission is performed at different transmission points, phases of signals transmitted between respective transmission points may not be the same, and it may thus be difficult to distinguish the ports via CDM. Therefore, as described with reference to FIG. 7A and FIG. 7B, it is necessary to assign and transmit DMRS ports in different CDM groups to respective transmission points.

The upper part of FIG. 8D illustrates an example of a case in which NCJT is performed at different transmission points via multiple antenna panels (e.g., the antenna 801 panel installed on the rooftop of the vehicle terminal and the antenna panel 802 installed on the front bumper of the vehicle terminal) installed in the vehicle terminal 810. The bottom of FIG. 8D illustrates an example of a case in which two different vehicle terminals 810 and 812 perform NCJT at different transmission points via antenna panels installed in respective vehicles. When NCJT is performed as illustrated in the lower part of FIG. 8D, related information for performing NCJT between the vehicle terminals 810 and 812 may be exchanged. When a service, such as platooning, is performed in the sidelink, an NCJT transmission scenario as illustrated in the lower part of FIG. 8D may be useful. For example, in a case of different terminals belonging to a group, if a leader terminal performs NCJT transmission, the leader terminal may concurrently receive information from multiple terminals. In this way, a more suitable NCJT transmission environment may be generated in a sidelink by the antenna structure installed in the vehicle terminal.

In order to support the multi-antenna transmission in the sidelink, a DMRS port indication method, a CDM group number indication method, and the like may be considered. A method of using one or more transmission configuration indicators (TCIs) may be considered to support NCJT. Therefore, in the following embodiments, methods for supporting multi-antenna transmission in sidelink communication are presented via detailed embodiments. In the disclosure, the following embodiments may be used in combination with each other. In the disclosure, when only up to 4-layer transmission is considered as multi-antenna transmission in the sidelink, the use of only one codeword may be assumed. In other words, codeword 0 may be enabled and codeword 1 may be disabled. However, the content of the disclosure is not limited to using only one codeword up to 4-layer transmission.

First Embodiment

The first embodiment presents details for supporting the increased number of layers for SU-MIMO transmission in sidelink communication. In a general NR-based sidelink system, only SU-MIMO is supported as a multi-antenna transmission method, and the transmission terminal may indicate, with 1 bit, PSSCH DMRS port information to another terminal via $1^{st}$ stage SCI (SCI format 1-A) as illustrated in Table 2 below. Here, the $1^{st}$ stage SCI may be transmitted via a PSCCH. A sidelink communication terminal may identify resource allocation information via decoding of the $1^{st}$ stage SCI transmitted through the PSCCH, and may measure reference signal received power (RSRP) by using PSSCH DMRS port information so as to perform sensing and resource allocation of mode-2. Therefore, it may be preferable that resource allocation-related information and PSSCH DMRS port information are transmitted via the $1^{st}$ stage SCI.

TABLE 2

| Values of the Number of DMRS port field | Antenna ports |
| --- | --- |
| 0 | 1000 |
| 1 | 1000 and 1001 |

According to an embodiment, if "0" is indicated in Table 2, PSSCH DMRS port 1000 may be assigned so that single layer transmission may be performed. Alternatively, if "1" is indicated, PSSCH DMRS ports 1000 and 1001 may be assigned so that 2-layer SU-MIMO transmission may be performed. In this case, FIG. 7A is referred to for a DMRS pattern in frequency. Referring to FIG. 7A, it is noted that only one CDM group is used.

As in FIG. 8B, in order to support the increased number of layers for SU-MIMO transmission in sidelink communication, fields "2" and "3" for indicating, with 2 bits, the increased number of layers in comparison with Table 2 may be added as shown in Table 3 below.

TABLE 3

| Values of the Number of DMRS port field | Antenna ports |
| --- | --- |
| 0 | 1000 |
| 1 | 1000 and 1001 |

TABLE 3-continued

| Values of the Number of DMRS port field | Antenna ports |
|---|---|
| 2 | 1000-1002 |
| 3 | 1000-1003 |

According to an embodiment, if "2" is indicated in Table 3, PSSCH DMRS ports 1000, 1001, and 1002 may be assigned so that 3-layer transmission may be performed. If "3" is indicated, PSSCH DMRS ports 1000, 1001, 1002, and 1003 may be assigned so that 4-layer SU-MIMO transmission may be performed. FIG. 7B is referred to for a DMRS pattern in frequency indicated by "2" or "3". Referring to FIG. 7B, it is noted that two CDM groups are used to indicate increased DMRS port information. The method of indicating PSSCH DMRS port information described with field "2" or "3" in Table 3 may be accomplished via various methods as follows.

Method 1-1: Reserved bits in SCI format 1-A
Method 1-2: New $1^{st}$ SCI format
Method 1-3: Existing $2^{nd}$ SCI format 2-A or 2-B
Method 1-4: New $2^{nd}$ SCI format Method 1-1

Method 1-1 is a method using reserved bits in SCI format 1-A. In SCI format 1-A, 2 to 4 bits may be used as reserved bits. Specifically, the reserved bits of the PSCCH may be (pre-)configured with a value of 2, 3, or 4 bits via resource pool information. If the reserved bits of the PSCCH are configured to 2 bits, PSSCH DMRS port information described with the field "2" or "3" in Table 3 may be indicated as shown in Table 4 below.

TABLE 4

| Values for reserved field | Note |
|---|---|
| 00 | Rel-16 |
| 01 | 1000-1002 |
| 10 | 1000-1003 |
| 11 | |

In Table 4, "00" may be defined to be a value used in a general NR-based sidelink system. Additional information may be indicated using at least one field among "01", "10", and "11" of the reserved bits. According to an embodiment, "01" may cause PSSCH DMRS ports 1000, 1001, and 1002 to be assigned so as to indicate 3-layer transmission as in field "2" in Table 3. When "01" is indicated, information indicated via SCI format 1-A may not be used as shown in Table 2. In addition, "10" may cause PSSCH DMRS ports 1000, 1001, 1002, and 1003 to be assigned so as to indicate SU-MIMO transmission of 4 layers as in field "3" in Table 3. When "10" is indicated, information indicated via SCI format 1-A may not be used as shown in Table 2.

Table 4 is an example in which the reserved bits of the PSCCH are configured to 2 bits, and even when the reserved bits of the PSCCH are configured to 3 bits or 4 bits, the increased number of layers for SU-MIMO transmission may be supported in a similar way.

Specifically, if the reserved bits of the PSCCH are configured to 3 bits, "000" may be defined to be a value used in a general NR-based sidelink system. Additional information may be indicated using at least one field among "001", "010", "011", "100", "101", "110", and "111" of the reserved bits.

Alternatively, if the reserved bits of the PSCCH are configured to 4 bits, "0000" may be defined to be a value used in a general NR-based sidelink system. Additional information may be indicated using at least one field among "0001", "0010", "0011", "0100", "0101", "0110", "0111", "1000", "1100", "1101", "1011", "1001", "1010", "1110", and "1111" of the reserved bits.

Method 1-2

Method 1-2 is a method of defining a new $1^{st}$ SCI format and defining a field for supporting the increased number of layers for SU-MIMO transmission in the corresponding format. For example, the new $1^{st}$ SCI format may be named SCI format 1-B. The number of layers of SU-MIMO transmission may be supported from 1 to 4 by adding a field, as shown in Table 3, to the corresponding format. If Method 1-2 is used, a method of separately operating resource pools of a terminal supporting only general NR-based sidelink communication and a terminal supporting sidelink communication may be considered.

Method 1-3

Method 1-3 is a method of defining a field for supporting the increased number of layers for SU-MIMO transmission in $2^{nd}$ SCI format 2-A or $2^{nd}$ SCI format 2-B. The number of layers of SU-MIMO transmission may be supported from 1 to 4 by adding a 2-bit field to the corresponding format as shown in Table 5 below.

TABLE 5

| Values of the Number of DMRS port field | Antenna ports |
|---|---|
| 0 | If this field is indicated, Table 2 is used for indicating # of DMRS ports (For Rel-16) |
| 1 | 1000-1002 |
| 2 | 1000-1003 |
| 3 | reserved |

If "0" is indicated in Table 5, DMRS port information indicated via $1^{st}$ stage SCI (SCI format 1-A) may be used as in Table 2. On the other hand, if "1" is indicated, PSSCH DMRS ports 1000, 1001, and 1002 may be assigned to perform 3-layer transmission. Information indicated via SCI format 1-A may not be used. If "2" is indicated, PSSCH DMRS ports 1000, 1001, 1002, and 1003 may be assigned so that 4-layer SU-MIMO transmission may be performed. Information indicated via SCI format 1-A may not be used.

As described above, a terminal may perform sensing and resource selection via RSRP measurement by using PSSCH DMRS port information. In this case, a method of measuring RSRP for PSSCH DMRS only in DMRS port 1000 at all times may be considered. Alternatively, a method of measuring RSRP for PSSCH DMRS only in a PSSCH DMRS port identified by only PSCCH ($1^{st}$ stage SCI) decoding may be considered. For example, a method of measuring RSRP only in DMRS ports indicated in the PSCCH ($1^{st}$ stage SCI) may be considered. If the DMRS ports indicated in the PSCCH ($1^{st}$ stage SCI) are DMRS ports 1000 and 1001, an average value of RSRP measured in each port may be used as an RSRP value. If this method is used, even if a PSSCH DMRS port indicated via $2^{nd}$ SCI is greater than 2, RSRP measurement may be performed only in one or two DMRS ports.

Method 1-4

Method 1-4 is a method of defining a new $2^{nd}$ SCI format and defining a field for supporting the increased number of layers for SU-MIMO transmission in the corresponding format. For example, the new $1^{st}$ SCI format may be named SCI format 2-C. In a scheme similar to Method 1-3, the number of layers of SU-MIMO transmission may be supported from 1 to 4 by adding a field as shown in Table 5.

Like Method 1-3, a method of measuring RSRP for PSSCH DMRS only in DMRS port 1000 at all times may be considered. Alternatively, a method of measuring RSRP for PSSCH DMRS only in a PSSCH DMRS port identified by only PSCCH ($1^{st}$ stage SCI) decoding may be considered. For example, a method of measuring RSRP only in DMRS ports indicated in the PSCCH ($1^{st}$ stage SCI) may be considered. If the DMRS ports indicated in the PSCCH ($1^{st}$ stage SCI) are DMRS ports 1000 and 1001, an average value of RSRP measured in each port may be used as an RSRP value. If such a method is used, even if a PSSCH DMRS port indicated via $2^{nd}$ SCI is greater than 2, RSRP measurement may be performed only in one or two DMRS ports.

Second Embodiment

The second embodiment presents details for supporting MU-MIMO transmission in sidelink communication. In a general NR-based sidelink system, only 2-layer SU-MIMO is supported as a multi-antenna transmission method, and the transmission terminal may indicate, with 1 bit, PSSCH DMRS port information to another terminal via $1^{st}$ stage SCI (SCI format 1-A) as illustrated in Table 2. Here, the $1^{st}$ stage SCI may be transmitted via a PSCCH. A sidelink communication terminal may identify resource allocation information via decoding of the $1^{st}$ stage SCI transmitted through the PSCCH, and may measure a reference signal received power (RSRP) by using PSSCH DMRS port information so as to perform sensing and resource allocation of mode-2. Therefore, it may be preferable that resource allocation-related information and PSSCH DMRS port information are transmitted via the $1^{st}$ stage SCI.

As illustrated in FIG. 8C, in order to support MU-MIMO transmission in sidelink communication, information more than PSSCH DMRS port information presented in Table 2 may be added. According to the number of MU-MIMO support layers, various combinations of MU-MIMO transmission may be made.

Specifically, when 2-layer MU-MIMO transmission is performed, the transmission terminal may assign different PSSCH DMRS ports to two different reception terminals so as to perform MU-MIMO transmission, as described below.

MU-MIMO 2 layers: One UE 1 layer+One UE 1 layer

Alternatively, in the case of 3-layer MU-MIMO transmission, the transmission terminal may assign different PSSCH DMRS ports to three different reception terminals or two reception terminals so as to perform MU-MIMO transmission, as described below.

MU-MIMO 3 layers:
One UE 1 layer+One UE 1 layer+One UE 1 layer, or
One UE 2 layers+One UE 1 layer Alternatively, when 4-layer MU-MIMO transmission is performed, the transmission terminal may assign different PSSCH DMRS ports to four different reception terminals, three reception terminals, or two reception terminals so as to perform MU-MIMO transmission, as described below.

MU-MIMO 4 layers:
One UE 1 layer+One UE 1 layer+One UE 1 layer+One UE 1 layer
One UE 3 layers+One UE 1 layer
One UE 2 layers+One UE 2 layers, or
One UE 2 layers+One UE 1 layer+One UE 1 layer Alternatively, MU-MIMO operations based on a greater number of layers than the aforementioned 4 layers may be applied by applying an embodiment disclosed herein.

The number of CDM groups assigned by the transmission terminal may be indicated together with additional PSSCH DMRS port information for MU-MIMO transmission. Based on information on the number of CDM groups assigned by the transmission terminal, the reception terminal may accurately determine a location to which a PSSCH DMRS has been assigned so as to perform channel estimation and data decoding. Indication of additional PSSCH DMRS port information and information on the number of CDM groups may be made via the following various methods. The PSSCH DMRS port information and the number of CDM groups may be indicated by the same method, or the PSSCH DMRS port information and the number of CDM groups may be indicated by different methods.

Method 2-1: Reserved bits in SCI format 1-A
Method 2-2: New $1^{st}$ SCI format
Method 2-3: Existing $2^{nd}$ SCI format 2-A or 2-B
Method 2-4: New $2^{nd}$ SCI format Method 2-1

Method 2-1 is a method using reserved bits in SCI format 1-A. In SCI format 1-A, 2 to 4 bits may be used as reserved bits. Specifically, the reserved bits of the PSCCH may be (pre-)configured with a value of 2, 3, or 4 bits via resource pool information. If the reserved bits of the PSCCH are configured to 2 bits, PSSCH DMRS port information for MU-MIMO may be indicated using the same, as shown in Table 6 below.

TABLE 6

| Values for reserved field | Note |
| --- | --- |
| 00 | If this field is indicated, Table 2 is used for indicating # of DMRS ports (For Rel-16) |
| 01 | Used to for indicating DMRS antenna port 1001 (indicated field by Table 2 can be ignored) |
| 10 | |
| 11 | |

As described above, various combinations of MU-MIMO transmission may be generated according to the number of MU-MIMO support layers. In Table 6, a case in which 2-layer MU-MIMO is supported in the sidelink has been considered.

In Table 6, "00" may be defined to be a value used in a general NR-based sidelink system. Therefore, the field presented in Table 2 may be used to indicate PSSCH DMRS port information. In the disclosure, additional information may be indicated using at least one field among "01", "10", and "11" of the reserved bits. For example, PSSCH DMRS port information for MU-MIMO may be indicated. According to an embodiment, "01" may be used to indicate PSSCH DMRS port 1001. As an example, the transmission terminal may perform 2-layer MU-MIMO.

As illustrated in the upper part of FIG. 8C, the transmission terminal 810 may indicate field "0" of Table 2 to one reception terminal 820, and may indicate PSSCH DMRS port 1000 by indicating field "00" of Table 6. The transmission terminal 810 may indicate PSSCH DMRS port 1001 by indicating field "01" of Table 6 to another reception terminal 822. In this case, the field indicated to the another reception terminal via Table 2 may be ignored. Alternatively, when field "0" of Table 2 is indicated to the reception terminal, and field "01" of Table 6 is indicated, field "0" of Table 2 may be considered to indicate PSSCH DMRS port 1001 instead of PSSCH DMRS port 1000.

Even if the reserved bits of the PSCCH are configured to 3 bits or 4 bits, MU-MIMO transmission in the sidelink may be supported in a similar way. Specifically, if the reserved bits of the PSCCH are configured to 3 bits, "000" may be defined to be a value used in a general NR-based sidelink system. Additional information may be indicated using at least one field among "001", "010", "011", "100", "101", "110", and "111" of the reserved bits. Alternatively, if the reserved bits of the PSCCH are configured to 4 bits, "0000" may be defined to be a value used in a general NR-based sidelink system. Additional information may be indicated using at least one field among "0001", "0010", "0011", "0100", "0101", "0110", "0111", "1000", "1100", "1101", "1011", "1001", "1010", "1110", and "1111" of the reserved bits. Specifically, when the reserved bits of the PSCCH are configured to 3 bits or 4 bits, PSSCH DMRS port information for MU-MIMO and information on the number of CDM groups may be indicated in the same way as in Table 7 below.

when field "0" of Table 2 is indicated to the reception terminal, and field "001" of Table 7 is indicated, field "0" of Table 2 may be considered to indicate PSSCH DMRS port 1001 instead of PSSCH DMRS port 1000.

As another example, the transmission terminal may perform 4-layer MU-MIMO.

As illustrated in the lower part of FIG. 8C, the transmission terminal 810 may indicate, to four different reception terminals (820, 822, 824, and 826), fields "010", "011", "100" and "101" of Table 7 so as to indicate PSSCH DMRS ports 1000, 1001, 1002, and 1003, respectively. In this case, the fields indicated in Table 2 may be ignored. Also, the number of CDM groups used in this case may be interpreted as 2. In Table 7, fields "110" and "111" may be used to assign 2 layers to one terminal during MU-MIMO transmission. Therefore, based on the indication of Table 7, transmission of a combination, such as 2 layers (one UE 1 layer+one UE 1 layer), 3 layers (one UE 1 layer+one UE 1 layer+one UE 1 layer, or one UE 2 layers+one UE 1 layer), and 4 layers (one UE 1 layer+one UE 1 layer+one UE 1 layer+one UE 1 layer, one UE 2 layers+one UE 2 layers, or one UE 2 layers+one UE 1 layer+one UE 1 layer), may be possible

TABLE 7

Values for reserved field

| 3 bit reserved field | 4 bit reserved field | Note |
| --- | --- | --- |
| 000 | 0000 | If this field is indicated, Table 2 is used for indicating # of DMRS ports (For Rel-16) |
| 001 | 0001 | Used to for indicating DMRS antenna port 1001 (indicated field by Table 2 can be ignored), one CDM group |
| 010 | 0010 | Used to for indicating DMRS antenna port 1000 (indicated field by Table 2 can be ignored), two CDM group |
| 011 | 0011 | Used to for indicating DMRS antenna port 1001 (indicated field by Table 2 can be ignored), two CDM group |
| 100 | 0100 | Used to for indicating DMRS antenna port 1002 (indicated field by Table 2 can be ignored), two CDM group |
| 101 | 0101 | Used to for indicating DMRS antenna port 1003 (indicated field by Table 2 can be ignored), two CDM group |
| 110 | 0110 | Used to for indicating DMRS antenna port 1000 and 1001 (indicated field by Table 2 can be ignored), two CDM group |
| 111 | 0111 | Used to for indicating DMRS antenna port 1002 and 1003 (indicated field by Table 2 can be ignored), two CDM group |
|  | 1000 | reserved |
|  | 1100 | reserved |
|  | 1101 | reserved |
|  | 1011 | reserved |
|  | 1001 | reserved |
|  | 1010 | reserved |
|  | 1110 | reserved |
|  | 1111 | reserved |

According to an embodiment, when the reserved bits of the PSCCH in Table 7 are 3 bits, "000" may be used to indicate that a field presented in Table 2 indicates PSSCH DMRS port information. "001" may be used to indicate PSSCH DMRS port 1001 and indicate that the number of used CDM groups is one. As an example, the transmission terminal may perform 2-layer MU-MIMO.

As illustrated in the upper part of FIG. 8C, the transmission terminal 810 may indicate field "0" of Table 2 to one reception terminal 820, and may indicate PSSCH DMRS port 1000 by indicating field "000" of Table 7. The transmission terminal 810 may indicate PSSCH DMRS port 1001 by indicating field "001" of Table 7 to another reception terminal 822. In this case, the field indicated to the another reception terminal via Table 2 may be ignored. Alternatively, during MU-MIMO transmission. In Table 7, even when the reserved bits of the PSCCH are 4 bits, PSSCH DMRS port information for MU-MIMO and information on the number of CDM groups may be indicated in a similar way to the above description. In Table 7, when the reserved bits of the PSCCH are 4 bits, reserved fields may be used to indicate other information.

Method 2-2

Method 2-2 is a method of defining a new $1^{st}$ SCI format and defining fields for PSSCH DMRS port information for MU-MIMO transmission and the number of used CDM groups in the corresponding format. For example, the new $1^{st}$ SCI format may be named SCI format 1-B. SU-MIMO and MU-MIMO transmission in the sidelink may be supported by adding a 3-bit field to the corresponding format as shown in Table 8 below. Alternatively, as shown in Table 9, SU-MIMO and MU-MIMO transmission in the sidelink may be supported by adding a 4-bit field. If Method 2 is used, a method of separately operating resource pools of a terminal supporting only general NR-based sidelink communication and a terminal supporting sidelink communication proposed in the disclosure may be considered.

TABLE 8

| Values | Number of DMRS CDM group(s) without data | Antenna ports |
| --- | --- | --- |
| 0 | 1 | 1000 |
| 1 | 1 | 1001 |
| 2 | 1 | 1000, 1001 |
| 3 | 2 | 1000 |
| 4 | 2 | 1001 |
| 5 | 2 | 1002 |
| 6 | 2 | 1003 |
| 7 | Reserved | Reserved |

In Table 8, during MU-MIMO transmission, transmission of a combination, such as 2 layers (one UE 1 layer by field "0"+one UE 1 layer by field "1"), 3 layers (one UE 1 layer by field "3"+one UE 1 layer by field "4"+one UE 1 layer by field "5"), and 4 layers (one UE 1 layer by field "3"+one UE 1 layer by field "4"+one UE 1 layer by field "5"+one UE 1 layer by field "6"), may be possible. During SU-MIMO transmission, 2 layers (one UE 2 layers by field "2") may be possible.

TABLE 9

| Values | Number of DMRS CDM group(s) without data | Antenna ports |
| --- | --- | --- |
| 0 | 1 | 1000 |
| 1 | 1 | 1001 |
| 2 | 1 | 1000, 1001 |
| 3 | 2 | 1000 |
| 4 | 2 | 1001 |
| 5 | 2 | 1002 |
| 6 | 2 | 1003 |
| 7 | 2 | 1000, 1001 |
| 8 | 2 | 1002, 1003 |
| 9 | 2 | 1000, 1001, 1002 |
| 10 | 2 | 1000, 1001, 1002, 1003 |
| 11 | 2 | 1000, 1002 |
| 12-15 | reserved | reserved |

In Table 9, during MU-MIMO transmission, transmission of a combination, such as 2 layers (one UE 1 layer by field "0"+one UE 1 layer by field "0"), 3 layers (one UE 1 layer by field "3"+one UE 1 layer by field "4"+one UE 1 layer by field "5" or one UE 2 layers by field "7"+one UE 1 layer by field "5"), and 4 layers (one UE 1 layer by field "3"+one UE 1 layer by field "4"+one UE 1 layer by field "5"+one UE 1 layer by field "6", one UE 2 layers by field "7"+one UE 2 layers by field "8", or one UE 2 layers by field "7"+one UE 1 layer by field "5"+one UE 1 layer by field "6"), may be possible. During SU-MIMO transmission, 2 layers (one UE 2 layers by field "2" or one UE 2 layers by field "11"), 3 layers (one UE 2 layers by field "9"), and 4 layers (one UE 2 layers by field "10") would be possible. However, not all fields of Table 9 should be used. For example, when 2-layer SU-MIMO transmission is performed, if frequency division multiplexing (FDM) between DMRS ports is not supported, field "11" may not be used.

Method 2-3

Method 2-3 is a method of including information related to MU-MIMO transmission in $2^{nd}$ SCI format 2-A or $2^{nd}$ SCI format 2-B. Unlike SU-MIMO of the first embodiment, in MU-MIMO, multiple reception terminals may be assigned with different PSSCH DMRS ports from the transmission terminal. Therefore, with reference to FIG. 7A and FIG. 7B, whether the number of CDM groups used as information related to MU-MIMO transmission is one or two may be indicated with 1-bit information in $2^{nd}$ SCI format 2-A or $2^{nd}$ SCI format 2-B.

Method 2-4

Method 2-4 is a method of defining a new $2^{nd}$ SCI format and defining a field for supporting the increased number of layers for SU-MIMO transmission in the corresponding format. For example, the new $1^{st}$ SCI format may be named SCI format 2-C. Unlike SU-MIMO of the first embodiment, in MU-MIMO, multiple reception terminals may be assigned with different PSSCH DMRS ports from the transmission terminal. Therefore, with reference to FIG. 7A and FIG. 7B, whether the number of CDM groups used as information related to MU-MIMO transmission is one or two may be indicated with 1-bit information in a new $2^{nd}$ SCI format.

Third Embodiment

The third embodiment presents details for supporting NCJT in sidelink communication. In a general NR-based sidelink system, only SU-MIMO is supported as a multi-antenna transmission method, and the transmission terminal may indicate, with 1 bit, PSSCH DMRS port information to another terminal via $1^{st}$ stage SCI (SCI format 1-A) as illustrated in Table 2. Here, the $1^{st}$ stage SCI may be transmitted via a PSCCH. A sidelink communication terminal may identify resource allocation information via decoding of the $1^{st}$ stage SCI transmitted through the PSCCH, and may measure reference signal received power (RSRP) by using PSSCH DMRS port information so as to perform sensing and resource allocation of mode-2. Therefore, it may be preferable that resource allocation-related information and PSSCH DMRS port information are transmitted via the $1^{st}$ stage SCI.

As illustrated in FIG. 8D, in order to support NCJT transmission in sidelink communication, information more than PSSCH DMRS port information presented in Table 2 may be added. Unlike the aforementioned SU-MIMO or MU-MIMO transmission, in the case of NCJT transmission, for PSSCH DMRS port assignment, it is necessary to assign DMRS ports belonging to different CDM groups. This is because DMRS ports belonging to the same CDM group should be distinguished via CDM, wherein, if NCJT transmission is performed at different transmission points, phases of signals transmitted between respective transmission points may not be the same, and thus it may be difficult to distinguish the ports via CDM. Therefore, as described with reference to FIG. 7A and FIG. 7B, it is necessary to assign DMRS ports in different CDM groups to respective transmission points so as to perform transmission.

In order to support NCJT, one or more transmission configuration indicators (TCIs) need to be supported. In this case, one TCI may include a reference signal (RS) ID and quasi co-location (QCL) information. An RS ID may be an ID for an RS used as a beam reference, and in order for the terminal to smoothly receive and decode a PSCCH/PSSCH in the sidelink, information on a QCL relationship between antenna ports (e.g., a PSCCH DMRS port, a PSSCH DMRS port, or a sidelink CSI-RS port) through which sidelink channels are transmitted may be transferred. A QCL relationship between antenna ports may have one of the following four total QCL types.

"QCL-typeA": {Doppler shift, Doppler spread, average delay, delay spread}
"QCL-typeB": {Doppler shift, Doppler spread}
"QCL-typeC": {Doppler shift, average delay}
"QCL-typeD": {Spatial RX parameter}

If a part of the aforementioned QCL types is shared between two different antenna ports or if one antenna port refers to a part of QCL types of the other antenna port, the terminal may assume that the two antenna ports have the same value by sharing a parameter supported by the shared or referred QCL type. Therefore, in the case of NCJT transmission, RS IDs and QCL information may not be the same for signals transmitted from different transmission points, and therefore one or more TCIs need to be activated.

When one or more TCIs are activated, the terminal having received signals through NCJT may perform channel estimation for received PSSCH DMRS ports by using the RS IDs and QCL information in respective TCI states. Therefore, if the transmission terminal performs NCJT transmission, PSSCH DMRS port assignment information and TCI information according thereto need to be indicated to a reception terminal. The DMRS port assignment information may include DMRS port information and information on the number of used CDM groups. Indication of the information may be performed through various methods as follows. Here, the PSSCH DMRS port assignment information and the TCI information may be indicated in the same method, or the PSSCH DMRS port assignment information and the TCI information may be indicated in different methods.

Method 3-1: Reserved bits in SCI format 1-A
Method 3-2: New $1^{st}$ SCI format
Method 3-3: Existing $2^{nd}$ SCI format 2-A or 2-B
Method 3-4: New $2^{nd}$ SCI format
Method 3-5: higher layer configuration (e.g., (pre-)configuration in resource pool or PC5-RRC configuration, Sidelink MAC CE)

Method 3-1

Method 3-1 is a method using reserved bits in SCI format 1-A. In SCI format 1-A, 2 to 4 bits may be used as reserved bits. Specifically, the reserved bits of the PSCCH may be (pre-)configured with a value of 2, 3, or 4 bits via resource pool information. If the reserved bits of the PSCCH are configured to 2 bits, information for NCJT may be indicated using the same in the same way as shown in Table 10 below.

TABLE 10

| Values for reserved field | Note |
|---|---|
| 00 | If this field is indicated, Table 2 is used for indicating # of DMRS ports (For Rel-16) |
| 01 | Used to for indicating DMRS antenna port 1001 (indicated field by Table 2 can be ignored), one CDM group, one TCI state |
| 10 | Used to for indicating DMRS antenna ports 1000 and 1002 (indicated field by Table 2 can be ignored), two CDM groups, two TCI states |
| 11 | |

In Table 10, a case in which 2-layer NCJT is supported in the sidelink has been considered.

In Table 10, "00" may be defined to be a value used in a general NR-based sidelink system. Therefore, the field presented in Table 2 may be used to indicate PSSCH DMRS port information. Additional information may be indicated using fields of "01", "10", and "11" of the reserved bits. For example, PSSCH DMRS port information for MU-MIMO and NCJT may be indicated. Specifically, "01" may be used to indicate PSSCH DMRS port 1001 so as to perform MU-MIMO transmission. For details, the descriptions in Table 6 are referred to. In addition, "10" may be used to indicate PSSCH DMRS ports 1000 and 1002 so as to perform NCJT transmission. As an example, the transmission terminal may perform 2-layer NCJT.

As illustrated in FIG. 8D, the transmission terminal 810 may perform transmission to the reception terminal 820 by using PSSCH DMRS port 1000 at one transmission point 802, and may perform transmission to the same reception terminal 820 by using a PSSCH DMRS port (e.g., PSSCH DMRS port 1002) belonging to a CDM group different from that of DMRS port 1000 at another transmission point 801.

Even if the reserved bits of the PSCCH are configured to 3 bits or 4 bits, NCJT transmission in the sidelink may be supported in a similar way. Specifically, if the reserved bits of the PSCCH are configured to 3 bits, "000" may be defined to be a value used in a general NR-based sidelink system. Additional information may be indicated using at least one field among "001", "010", "011", "100", "101", "110", and "111" of the reserved bits. Alternatively, if the reserved bits of the PSCCH are configured to 4 bits, "0000" may be defined to be a value used in a general NR-based sidelink system. Additional information may be indicated using at least one field among "0001", "0010", "0011", "0100", "0101", "0110", "0111", "1000", "1100", "1101", "1011", "1001", "1010", "1110", and "1111" of the reserved bits. Therefore, according to the method, DMRS port information, the number of used CDM groups, and the number of TCI states which can be activated may be included in the reserved bits of the PSCCH so as to be transmitted.

Method 3-2

Method 3-2 is a method of defining a new $1^{st}$ SCI format and indicating NCJT transmission information in the corresponding format. For example, the new $1^{st}$ SCI format may be named as SCI format 1-B. SU-MIMO, MU-MIMO, and NCJT transmission in the sidelink can be supported by adding a 3-bit field to the corresponding format as shown in Table 11 below. If Method 3-2 is used, a method of separately operating resource pools of a terminal supporting only general NR-based sidelink communication and a terminal supporting sidelink communication disclosed herein may be considered.

TABLE 11

| Values | Number of DMRS CDM group(s) without data | Antenna ports | # of TCI states |
|---|---|---|---|
| 0 | 1 | 1000 | 1 |
| 1 | 1 | 1001 | 1 |
| 2 | 1 | 1000, 1001 | 1 |
| 3 | 2 | 1000 | 1 |
| 4 | 2 | 1001 | 1 |
| 5 | 2 | 1002 | 1 |
| 6 | 2 | 1003 | 1 |
| 7 | 2 | 1000, 1002 | 2 |

When Table 11 is used, the description of Table 8 may be referred to for a method of supporting SU-MIMO and MU-MIMO transmission. For example, by indicating "7" in Table 11, the transmission terminal may perform 2-layer NCJT. As illustrated in FIG. 8D, the transmission terminal 810 may perform transmission to the reception terminal 820 by using PSSCH DMRS port 1000 at one transmission point 802, and may perform transmission to the same reception terminal 820 by using a PSSCH DMRS port (e.g., PSSCH DMRS port 1002) belonging to a CDM group different from that of DMRS port 1000 at another transmission point 801. Use of two CDM groups and use of two TCI states may be indicated via the corresponding indication. Therefore, according to the method, DMRS port information, the number of used CDM groups, and the number of TCI states which can be activated may be included in the new $1^{st}$ SCI format. Similarly, SU-MIMO, MU-MIMO, and NCJT transmission in the sidelink can be supported by adding a 4-bit field as shown in Table 12 below.

TABLE 12

| Values | Number of DMRS CDM group(s) without data | Antenna ports | # of TCI states |
| --- | --- | --- | --- |
| 0 | 1 | 1000 | 1 |
| 1 | 1 | 1001 | 1 |
| 2 | 1 | 1000, 1001 | 1 |
| 3 | 2 | 1000 | 1 |
| 4 | 2 | 1001 | 1 |
| 5 | 2 | 1002 | 1 |
| 6 | 2 | 1003 | 1 |
| 7 | 2 | 1000, 1001 | 1 |
| 8 | 2 | 1002, 1003 | 1 |
| 9 | 2 | 1000, 1001, 1002 | 1 |
| 10 | 2 | 1000, 1001, 1002, 1003 | 1 |
| 11 | 2 | 1000, 1002 | 1 |
| 12 | 2 | 1000, 1002 | 2 |
| 13-15 | reserved | reserved | reserved |

When Table 12 is used, the description of Table 9 may be referred to for a method of supporting SU-MIMO and MU-MIMO transmission. For example, by indicating "12" in Table 12, the transmission terminal may perform 2-layer NCJT. In detailed operations, similar to the description of Table 11, the transmission terminal 810 may perform transmission to the reception terminal 820 by using PSSCH DMRS port 1000 at one transmission point 802, and may perform transmission to the same reception terminal 820 by using a PSSCH DMRS port (e.g., PSSCH DMRS port 1002) belonging to a CDM group different from that of DMRS port 1000 at another transmission point 801. Use of two CDM groups and use of two TCI states may be indicated via the corresponding indication. Therefore, according to the method, DMRS port information, the number of used CDM groups, and the number of TCI states which can be activated may be included in the new $1^{st}$ SCI format.

Method 3-3

Method 3-3 is a method of including information related to NCJT transmission in $2^{nd}$ SCI format 2-A or $2^{nd}$ SCI format 2-B. Information on NCJT transmission may be indicated by adding a 2-bit field to the corresponding format as shown in Table 13 below.

TABLE 13

| Values of the Number of DMRS port field | Antenna ports |
| --- | --- |
| 0 | If this field is indicated, Table 2 is used for indicating # of DMRS posts (For Rel-16) |
| 1 | Used to for indicating DMRS antenna ports 1000, 1002 (indicated field by Table 2 can be ignored), two CDM groups, two TCI states |
| 2 | reserved |
| 3 | reserved |

If "0" is indicated in Table 13, DMRS port information indicated via $1^{st}$ stage SCI (SCI format 1-A) may be used. On the other hand, if "1" is indicated, PSSCH DMRS ports 1000 and 1002 are assigned so that 2-layer NCJT transmission may be performed. Information indicated via SCI format 1-A may not be used. In detailed operations, similar to the description of Table 11, the transmission terminal may perform transmission to the reception terminal by using PSSCH DMRS port 1000 at one transmission point, and may perform transmission to the same reception terminal by using a PSSCH DMRS port (e.g., PSSCH DMRS port 1002) belonging to a CDM group different from that of DMRS port 1000 at another transmission point. Use of two CDM groups and use of two TCI states may be indicated via the corresponding indication.

As described above, a terminal may perform sensing and resource selection via RSRP measurement by using PSSCH DMRS port information. In this case, a method of measuring RSRP for PSSCH DMRS only in DMRS port 1000 at all times may be considered. Alternatively, a method of measuring RSRP for PSSCH DMRS only in a PSSCH DMRS port identified by only PSCCH ($1^{st}$ stage SCI) decoding may be considered. For example, a method of measuring RSRP only in DMRS ports indicated in the PSCCH ($1^{st}$ stage SCI) may be considered.

Method 3-4

Method 3-4 is a method of defining a new $2^{nd}$ SCI format and including information on NCJT transmission in the format. For example, the new $1^{st}$ SCI format may be named SCI format 2-C. In a scheme similar to Method 3-3, information necessary for NCJT transmission may be indicated by adding a field as shown in Table 13.

Like Method 3-3, a method of measuring RSRP for PSSCH DMRS only in DMRS port 1000 at all times may be considered. Alternatively, a method of measuring RSRP for PSSCH DMRS only in a PSSCH DMRS port identified by only PSCCH ($1^{st}$ stage SCI) decoding may be considered.

Method 3-5

Method 3-5 is a method of including information on NCJT transmission via a higher layer configuration. The DMRS port assignment information may include DMRS port information and information on the number of used CDM groups. Alternatively, a method in which only information on a TC state is configured via a higher layer may be considered. Specifically, the number of TCI states that have been activated may be configured in the upper layer.

For a higher layer configuration method, a method of (pre-)configuration via resource pool information may be considered. A method of configuring and indicating the information in PC5-RRC may also be considered. A method of configuring and indicating the information via a sidelink MAC-CE may also be considered. Indication via the PC5-RRC and the sidelink MAC-CE may be applied, for example, when NCJT transmission is unicast.

Fourth Embodiment

In the fourth embodiment, operations of a transmission terminal and a reception terminal in a case of supporting multi-antenna transmission in sidelink communication will be described via detailed flowcharts.

Figure 9A:
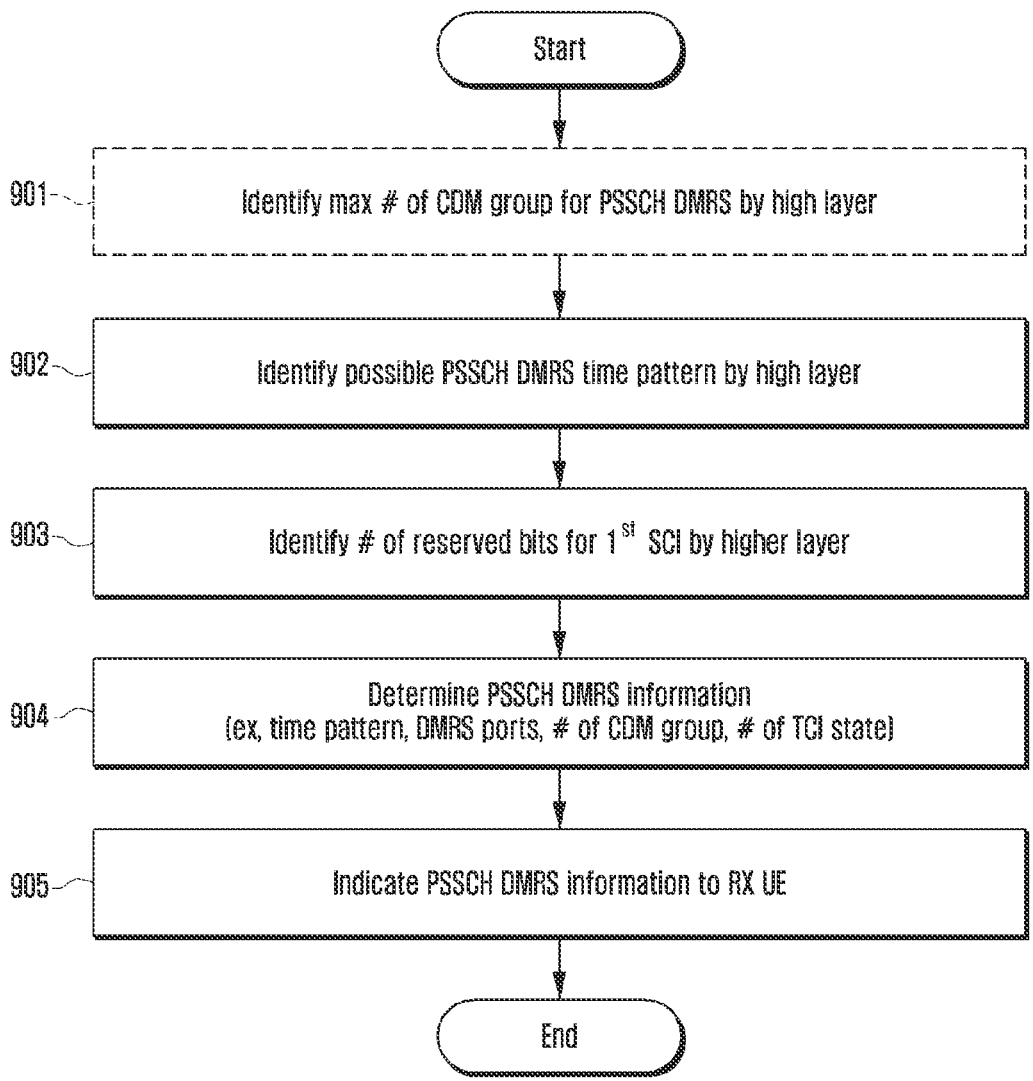
FIG. 9A illustrates a flowchart of operations of a transmission terminal according to an embodiment.
Figure 9B:
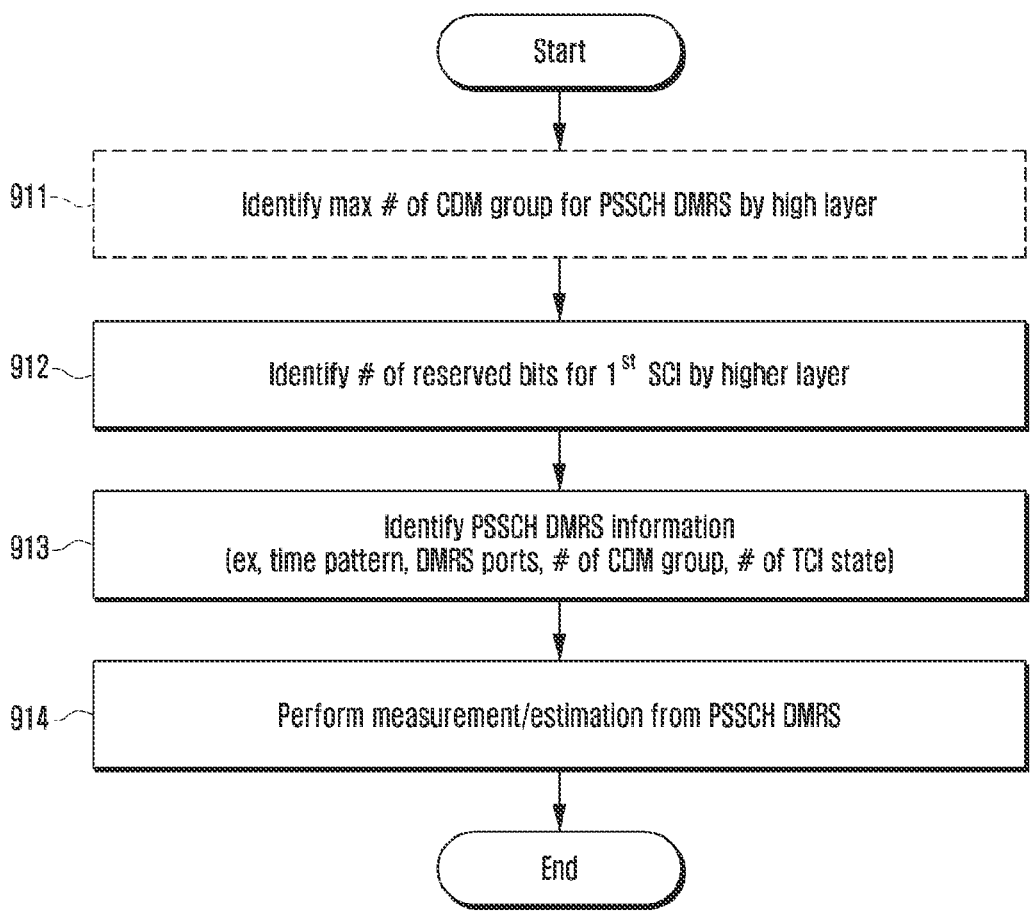
FIG. 9B illustrates a flowchart of operations of a reception terminal according to an embodiment.

FIG. 9A is a flowchart illustrating operations of a transmission terminal according to an embodiment, and FIG. 9B is a flowchart illustrating operations of a reception terminal according to an embodiment.

Referring to FIG. 9A, an operation of a transmission terminal for multi-antenna transmission in a sidelink is illustrated. Configuration information for a PSSCH DMRS in a sidelink may be configured via a higher layer. Here, configuration via a higher layer may include methods of (pre-)configuration via resource pool information, configuration via PC5-RRC, or configuration via a sidelink MAC-CE.

A transmission terminal may identify, in step 901, a maximum value of the number of CDM groups for a PSSCH DMRS. For example, the maximum value of the number of CDM groups available for the PSSCH DMRS described with reference to FIG. 7A and FIG. 7B may be configured via a higher layer. For example, the maximum value of the number of CDM groups may be configured to 2 or 1. When this method is used, the transmission terminal may identify the maximum value of the number of CDM groups configured from the higher layer. However, according to an embodiment, if it is not necessary to configure multiple CDM groups, step 901 may be omitted.

The transmission terminal may identify, in step 902, a possible time pattern of the PSSCH DMRS. For example, the number (PSSCH DMRS pattern information in time) of PSSCH DMRS symbols transmitted in a slot, described via Table 1, may be configured via the higher layer. For example, the number of PSSCH DMRS symbols transmitted in the slot, corresponding to {2}, {3}, {4}, {2, 3}, {2, 4}, {3, 4}, or {2, 3, 4}, may be (pre-)configured via resource pool information. When this method is used, the transmission terminal may determine PSSCH DMRS pattern information in time from the higher layer.

In step 903, the transmission terminal may identify the number of reserved bits configured (assigned) in $1^{st}$ SCI. For example, whether the configuration has been performed with 2, 3, or 4 bits of information may be (pre-)configured via resource pool information. When this method is used, the transmission terminal may identify, from the higher layer, information on the number of bits used when the reserved bits are assigned to $1^{st}$ SCI. If information on additional multi-antenna transmission is included via the reserved bits in the first to third embodiments, the number of bits of the used reserved bits may need to be configured according to content of the included information. For example, if information required for additional multi-antenna transmission is 4 bits, the terminal may not expect that the used reserved bits are configured to 2 or 3 bits.

In step 904, the transmission terminal may identify information for multi-antenna transmission. The information for multi-antenna transmission may be information related to the PSSCH DMRS. For example, if multiple PSSCH DMRS patterns in time have been configured, at least one of information on PSSCH DMRS patterns in time, PSSCH DMRS antenna ports assigned for multi-antenna transmission such as SU-MIMO, MU-MIMO, or NCJT, the number of CDM groups used for PSSCH DMRS, the number of TCI states to be activated, and the like may be identified. For example, in a case of the number of the CDM groups, if the maximum value is configured to 2 in step 901, the transmission terminal may determine whether to use one CDM group or use two CDM groups.

The transmission terminal may indicate, in step 905, the information determined via step 904 to a reception terminal according to the various methods presented in the first to third embodiments. For example, the SCI may be transmitted to the reception terminal by indication of at least one DMRS port to be used for sidelink communication, via at least one field among reserved bits in SCI format 1-A. Then, sidelink communication with the reception terminal may be performed.

Referring to FIG. 9B, an operation of a reception terminal for multi-antenna transmission in a sidelink is illustrated. Configuration information for a PSSCH DMRS in a sidelink may be configured via a higher layer. Here, configuration via a higher layer may include methods of (pre-)configuration via resource pool information, configuration via PC5-RRC, or configuration via a sidelink MAC-CE.

The reception terminal may identify, in step 911, a maximum value of the number of CDM groups for a PSSCH DMRS. For example, the maximum value of the number of CDM groups available for the PSSCH DMRS described with reference to FIG. 7A and FIG. 7B may be configured via a higher layer. For example, the maximum value of the number of CDM groups may be configured to 2 or 1. When this method is used, the reception terminal may identify the maximum value of the number of CDM groups configured from the higher layer. However, according to an embodiment, if it is not necessary to configure multiple CDM groups, step 911 may be omitted.

In step 912, the reception terminal may identify the number of reserved bits configured (assigned) in $1^{st}$ SCI. For example, whether configuration has been performed with 2, 3, or 4 bits of information may be (pre-)configured via resource pool information. When this method is used, the reception terminal may identify, from the higher layer, information on the number of bits used when the reserved bits are assigned to $1^{st}$ SCI. If information on additional multi-antenna transmission is included via the reserved bits in the first to third embodiments, the number of bits of the used reserved bits may need to be configured according to content of the included information. For example, if information required for additional multi-antenna transmission is 4 bits, the terminal may not expect that the used reserved bits are configured to 2 or 3 bits.

In step 913, the reception terminal may identify information for multi-antenna transmission. The information for multi-antenna transmission may be information related to the PSSCH DMRS. For example, if multiple PSSCH DMRS patterns in time have been configured, at least one of information on PSSCH DMRS patterns in time, PSSCH DMRS antenna ports assigned for multi-antenna transmission such as SU-MIMO, MU-MIMO, or NCJT, the number of CDM groups used for PSSCH DMRS, the number of activated TCI states, and the like may be identified.

For example, the reception terminal may identify information for the multi-antenna transmission via the SCI received from the transmission terminal according to the various methods presented in the aforementioned first to third embodiments. For example, SCI format 1-A may be received from the transmission terminal, and at least one DMRS port to be used for sidelink communication may be determined via at least one field among reserved bits in the SCI format 1-A.

As another example, information for the multi-antenna transmission may be identified via a higher configuration.

In step 914, the reception terminal may perform measurement or estimation for the PSSCH DMRS, based on the information for the multi-antenna transmission identified via the aforementioned operations. Then, sidelink communication with the transmission terminal may be performed.

According to an embodiment, if the transmission terminal is within coverage of a base station in the sidelink, the transmission terminal may consider an operation of receiving channel state information (CSI) from the reception terminal and reporting the CSI received from the reception terminal to the base station.

If the transmission terminal is within the coverage of the base station in the sidelink, the transmission terminal may consider an operation of receiving HARQ feedback information from the reception terminal and reporting the HARQ feedback information received from the reception terminal to the base station.

The base station that has received at least one of the CSI or HARQ feedback information reported by the transmission terminal may determine a channel state of the sidelink on the basis of the reported information. Thereafter, a method of receiving, from the base station, an indication of a multi-antenna transmission method in a sidelink selected by the transmission terminal according to various methods presented in the first to third embodiments may be considered.

When this method is used, the base station may indicate via DCI at least one piece of information, such as DMRS port information to be used by the transmission terminal in the sidelink, the number of used CDM groups, and the number of TCI states to be activated. If DCI is used, a method of adding corresponding information to DCI format 3-0 defined for indication of an existing sidelink and a method of using a newly defined DCI format for indication of a sidelink may be considered.

If the terminal fails to identify (or determine) information on the maximum value of the number of used CDM groups in step 901 of FIG. 9A or step 911 of FIG. 9B, the transmission terminal or the reception terminal may consider a method of assuming the corresponding value to be a specific value. For example, if the PSSCH DMRS patterns as shown in FIG. 7A and FIG. 7B are considered, the number of possible CDM groups may be 1 or 2, so that, if the transmission terminal or the reception terminal fails to identify (or determine) the corresponding value, the maximum value of the number of CDM groups may be assumed to be 1 or assumed to be 2.

Fifth Embodiment

The fifth embodiment provides a method of determining DMRS overhead when a TBS for PSSCH transmission is determined if multi-antenna transmission is supported in sidelink communication.

In a sidelink, unlike in general communication between a base station and a terminal, a DMRS overhead may not be determined by a DMRS overhead actually used by the terminal when a TBS for PSSCH transmission is determined. The disclosure provides a method of determining a DMRS overhead when a TBS for PSSCH transmission is determined in a case where multi-antenna transmission as shown in the embodiments is supported. The following Equation (1) may be used to determine the TBS for PSSCH transmission.

$$N_{RE}' = N_{sc}^{PRB}(N_{symb}^{sh} - N_{symb}^{PSFCH}) - N_{oh}^{PRB} - N_{RE'}^{DMRS} \quad (1)$$

In Equation (1), $N_{sc}^{PRB}$ is the number of subcarriers in one PRB, and may be, for example, 12. $N_{symb}^{sh}$ may indicate the number of sidelink symbols used in one slot except for one GUARD symbol and a first symbol used for AGC. FIG. 6A and FIG. 6B may be referred PSFCH to for details. $N_{symb}^{PSFCH}$ is the number of symbols used when a PSFCH resource is configured and, for example, if the PSFCH resource is transmitted, $N_{symb}^{PSFCH}$ may be configured to 3 including a GUARD symbol, and may be configured to 0 if no PSFCH resource is transmitted. FIG. 6A and FIG. 6B may be referred to for details. $N_{oh}^{PRB}$ is a value indicating overhead and may be (pre-)configured via resource pool information. $N_{RE'}^{DMRS}$ may represent an average value of DMRS overhead within one PRB.

Therefore, a value of $N_{RE'}$ calculated via Equation (1) may be used to determine a TBS. If the number of CDM groups according to the PSSCH DMRS transmission described in FIG. 7A and FIG. 7B is increased to 2 according to the multi-antenna transmission disclosed herein, PSSCH DMRS overhead may be determined via various methods as follows.

Method 5-1: A case in which the number of CDM groups is 2 is not considered, the number of CDM groups is assumed to be 1, and a value of $N_{RE'}^{DMRS}$ is used. (Increased PSSCH DMRS overhead is not reflected.)

Method 5-2: In consideration that the number of CDM groups is 2, a value of $N_{oh}^{PRB}$ is configured in Equation (1) so as to reflect increased PSSCH DMRS overhead.

Method 5-3: In consideration that the number of CDM groups is 2, a value of newly assumed $N_{RE'}^{DMRS}$ is applied to reflect overhead.

According to Method 5-1, a value of $N_{RE'}^{DMRS}$ for a case in which the maximum value of the number of CDM groups is 1 may be applied according to Table 14 below. In this case, the value of $N_{RE'}^{DMRS}$ may be applied according to a configuration value for the PSSCH DMRS pattern in time (pre-)configured via the resource pool, as presented in Table 14.

Alternatively, according to Method 5-2, PSSCH DMRS overhead may be reflected via adjustment of the $N_{oh}^{PRB}$ value in Equation (1). Specifically, the value of $N_{oh}^{PRB}$ may be configured differently when the maximum value of the number of CDM groups is configured to 1 and when the same is configured to 2. For example, the maximum value of the number of CDM groups may also be (pre-)configured via resource pool information, and if the maximum value of the number of CDM groups is configured to 2, the value of $N_{oh}^{PRB}$ may be reflected so as to be larger than that when the maximum value is configured to 1.

Alternatively, according to Method 5-3, the value of $N_{RE'}^{DMRS}$ for the case in which the maximum value of the number of CDM groups is 2 may be applied according to Table 14. In this case, the value of $N_{RE'}^{DMRS}$ may be applied according to a configuration value for the PSSCH DMRS pattern in time (pre-)configured via the resource pool, as presented in Table 14. In this case, according to Table 14, if the PSSCH DMRS pattern in time is configured to {2,3}, the value of $N_{RE'}^{DMRS}$ may be configured to 22 or 23. This represents an average value of possible integers of DMRS overhead in one PRB when the number of CDM groups is assumed to be 2. According to Table 14, if the PSSCH DMRS pattern in time is configured to {3,4}, the value of $N_{RE'}^{DMRS}$ may be configured to 31 or 32. This represents an average value of integers of DMRS overhead in one PRB when the number of CDM groups is assumed to be 2.

TABLE 14

| sl-PSSCH-DMRS-TimePattern | $N_{RE'}^{DMRS}$ (Max # of CDM group = 1) | $N_{RE'}^{DMRS}$ (Max # of CDM group = 2) |
| --- | --- | --- |
| {2} | 12 | 18 |
| {3} | 18 | 27 |
| {4} | 24 | 36 |
| {2, 3} | 15 | 22 or 23 |
| {2, 4} | 18 | 27 |
| {3, 4} | 21 | 31 or 32 |
| {2, 3, 4} | 18 | 27 |

Figure 10:
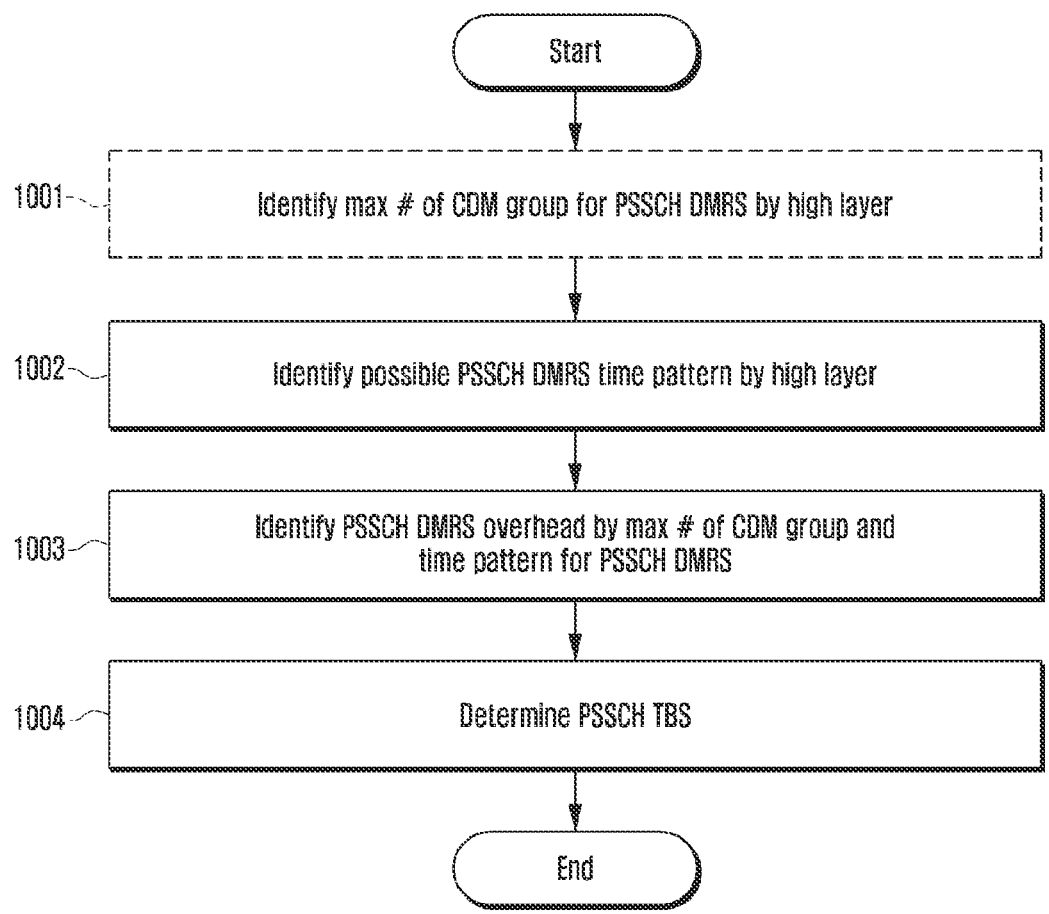
FIG. 10 illustrates a flowchart of operations of determining a TBS by a transmission terminal according to an embodiment.

FIG. 10 is a flowchart illustrating operations of determining a TBS by a transmission terminal according to an embodiment.

A transmission terminal may identify, in step 1001, a maximum value of the number of CDM groups for a PSSCH DMRS. For example, a maximum value of a CDM group, which is configured via a higher layer, may be identified. In this case, configuring of configuration information for the maximum value of the CDM group, which is used for the PSSCH DMRS described in FIG. 7A and FIG. 7B, via the higher layer in a sidelink may include methods of (pre-)configuration via resource pool information, configuration via PC5-RRC, or configuration via a sidelink MAC-CE.

The transmission terminal may identify, in step 1002, a possible time pattern of the PSSCH DMRS. For example, a configuration value for the PSSCH DMRS pattern in time, which is configured via the higher layer, may be identified. For example, the number of PSSCH DMRS symbols transmitted in the slot, corresponding to {2}, {3}, {4}, {2, 3}, {2, 4}, {3, 4}, or {2, 3, 4}, may be (pre-)configured via resource pool information.

In step 1003, the transmission terminal may identify a value of $N_{RE'}^{DMRS}$. For example, DMRS based on Method 5-3, the value of $N_{RE'}^{DMRS}$ may be identified from Table 14 according to whether the maximum value of the number of CDM groups has been configured to 2 or configured to 1 in step 1001 and a way in which the PSSCH DMRS pattern in time has been configured in step 1002.

In step 1004, the transmission terminal may determine a TBS for a PSSCH via Equation (1) and the value of $N_{RE'}^{DMRS}$ identified based on the aforementioned procedures. Then, sidelink communication may be performed based on the determined TBS.

Figure 11:
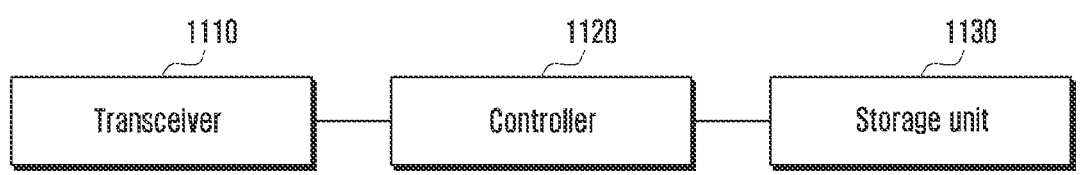
FIG. 11 illustrates a structure of a terminal according to an embodiment.

FIG. 11 is a diagram illustrating a structure of a terminal according to an embodiment.

Referring to FIG. 11, a terminal may include a transceiver 1110, a controller 1120, and a storage unit 1130. The controller may be defined as a circuit, an application-specific integrated circuit, or at least one processor. The terminal may include a transmission terminal or a reception terminal of sidelink or V2X communication.

The transceiver 1110 may transmit a signal to or receive a signal from another network entity. The transceiver 1110 may receive, for example, system information from a base station, and may receive a synchronization signal or a reference signal. Alternatively, the transceiver 1110 may transmit or receive data or control information to or from a terminal supporting the sidelink (or V2X communication).

The controller 1120 may control overall operations of the terminal. For example, the controller 1120 may control signal flows between respective blocks to perform operations according to the aforementioned flowchart. Specifically, the operation for multi-antenna transmission in the sidelink may be controlled. Alternatively, the operation for determining a TBS in the sidelink may be controlled.

The storage unit 1130 may store at least one of information transmitted or received via the transceiver 1110, information generated via the controller 1120, or pre-stored information. For example, the storage unit 1130 may store information configured via a sidelink MAC-CE, configured via a PC5-RRC, or (pre-)configured according to the methods disclosed herein.

Figure 12:
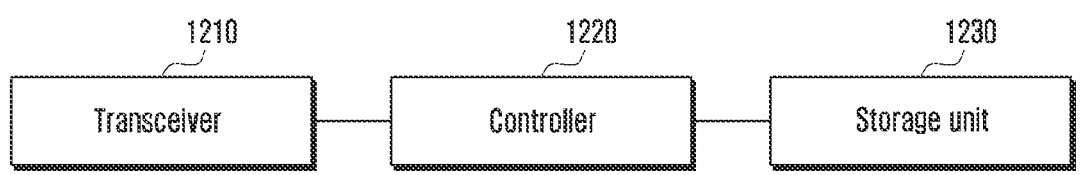
FIG. 12 illustrates a structure of a base station according to an embodiment of the disclosure.

FIG. 12 is a diagram illustrating a structure of a base station according to an embodiment.

Referring to FIG. 12, a base station may include a transceiver 1210, a controller 1220, and a storage unit 1230. The controller may be defined as a circuit, an application-specific integrated circuit, or at least one processor.

The transceiver 1210 may transmit a signal to or receive a signal from another network entity. The transceiver 1210 may transmit, for example, system information to a terminal and may transmit a synchronization signal or a reference signal.

The controller 1220 may control overall operations of the terminal. For example, the controller 1220 may control signal flows between respective blocks to perform operations according to the aforementioned flowchart. Specifically, the controller 1220 may control operation of transmitting cell-common information to a terminal via a sidelink system information block (SL-SIB) or transmitting configuration information to the terminal in a UE-specific (or UE-dedicated) manner after an RRC connection to the terminal is established. In addition, allocation of a transmission resource in the sidelink may be controlled.

The storage unit 1230 may store at least one of information transmitted or received via the transceiver 1210, information generated via the controller 1220, or pre-stored information.

The embodiments described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, all embodiments of the disclosure may be partially combined to operate a base station and a terminal.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a first terminal in a communication system, the method comprising:
identifying configuration information associated with sidelink communication;
obtaining first information associated with a physical sidelink shared channel (PSSCH) demodulation reference signal (DMRS) port for a second terminal;
transmitting, to the second terminal, $1^{st}$ stage sidelink control information (SCI) for the second terminal on a physical sidelink control channel (PSCCH), the $1^{st}$ stage SCI for the second terminal including the first information and scheduling information on $2^{nd}$ stage SCI for the second terminal; and
transmitting, to the second terminal, a PSSCH DMRS corresponding to the PSSCH DMRS port for the second terminal and the $2^{nd}$ stage SCI for the second terminal on a PSSCH,
wherein the first information is mapped to reserved bits of the $1^{st}$ stage SCI for the second terminal configured by the configuration information.

2. The method of claim 1, further comprising:
obtaining second information associated with a PSSCH DMRS port for a third terminal;
transmitting, to the third terminal, $1^{st}$ stage SCI for the third terminal on the PSCCH, the $1^{st}$ stage SCI for the third terminal including the second information and scheduling information on $2^{nd}$ stage SCI for the third terminal; and transmitting, to the third terminal, a PSSCH DMRS corresponding to the PSSCH DMRS port for the third terminal and the $2^{nd}$ stage SCI for the third terminal on the PSSCH, wherein the second information is mapped to reserved bits of the $1^{st}$ stage SCI for the third terminal configured by the configuration information, and wherein the PSSCH DMRS port for the third terminal is different from the PSSCH DMRS port for the second terminal.

3. The method of claim 1, wherein a number of the reserved bits is associated with a number of available code division multiplexing (CDM) groups for the PSSCH DMRS port for the second terminal, and wherein the number of the available CDM groups is configured by the configuration information.

4. The method of claim 3, wherein the number of the available CDM groups is 1 or 2.

5. The method of claim 3, wherein the PSSCH is transmitted based on a transport block size (TBS) determined based on an overhead value of the PSSCH DMRS, and wherein the overhead value is determined based on the number of the available CDM groups.

6. A method performed by a second terminal in a communication system, the method comprising:

identifying configuration information associated with sidelink communication;

receiving, from a first terminal, $1^{st}$ stage sidelink control information (SCI) on a physical sidelink control channel (PSCCH), the $1^{st}$ stage SCI including first information associated with a physical sidelink shared channel (PSSCH) demodulation reference signal (DMRS) port for the second terminal and scheduling information on $2^{nd}$ stage SCI; and receiving, from the first terminal, a PSSCH DMRS corresponding to the PSSCH DMRS port for the second terminal and the $2^{nd}$ stage SCI on a PSSCH, wherein the first information is mapped to reserved bits of the $1^{st}$ stage SCI for the second terminal configured by the configuration information.

7. The method of claim 6, wherein a number of the reserved bits is associated with a number of available code division multiplexing (CDM) groups for the PSSCH DMRS port for the second terminal, and wherein the number of the available CDM groups is configured by the configuration information.

8. The method of claim 7, the number of the available CDM groups is 1 or 2.

9. A first terminal in a communication system, the first terminal comprising:

a transceiver; and a processor coupled with the transceiver and configured to:

identify configuration information associated with sidelink communication;

obtain first information associated with a physical sidelink shared channel (PSSCH) demodulation reference signal (DMRS) port for a second terminal;

transmit, to the second terminal, $1^{st}$ stage sidelink control information (SCI) for the second terminal on a physical sidelink control channel (PSCCH), the $1^{st}$ stage SCI for the second terminal including the first information and scheduling information on $2^{nd}$ stage SCI for the second terminal; and transmit, to the second terminal, a PSSCH DMRS corresponding to the PSSCH DMRS port for the second terminal and the $2^{nd}$ stage SCI for the second terminal on a PSSCH, wherein the first information is mapped to reserved bits of the $1^{st}$ stage SCI for the second terminal configured by the configuration information.

10. The first terminal of claim 9, wherein the processor is further configured to:

obtain second information associated with a PSSCH DMRS port for a third terminal;

transmit, to the third terminal, $1^{st}$ stage SCI for the third terminal on the PSCCH, the $1^{st}$ stage SCI for the third terminal including the second information and scheduling information on $2^{nd}$ stage SCI for the third terminal; and transmit, to the third terminal, a PSSCH DMRS corresponding to the PSSCH DMRS port for the third terminal and the $2^{nd}$ stage SCI for the third terminal on the PSSCH, wherein the second information is mapped to reserved bits of the $1^{st}$ stage SCI for the third terminal configured by the configuration information, and wherein the PSSCH DMRS port for the third terminal is different from the PSSCH DMRS port for the second terminal.

11. The first terminal of claim 9, wherein a number of the reserved bits is associated with a number of available code division multiplexing (CDM) groups for the PSSCH DMRS port for the second terminal, and wherein the number of the available CDM groups is configured by the configuration information.

12. The first terminal of claim 11, wherein the number of the available CDM groups is 1 or 2.

13. The first terminal of claim 12, wherein the PSSCH is transmitted based on a transport block size (TBS) determined based on an overhead value of the PSSCH DMRS, and wherein the overhead value is determined based on the number of the available CDM groups.

14. A second terminal in a communication system, the second terminal comprising:

a transceiver; and a processor coupled with the transceiver and configured to:

identify configuration information associated with sidelink communication;

receive, from a first terminal, $1^{st}$ stage sidelink control information (SCI) on a physical sidelink control channel (PSCCH), the $1^{st}$ stage SCI including first information associated with a physical sidelink shared channel (PSSCH) demodulation reference signal (DMRS) port for the second terminal and scheduling information on $2^{nd}$ stage SCI; and receive, from the first terminal, a PSSCH DMRS corresponding to the PSSCH DMRS port for the second terminal and the $2^{nd}$ stage SCI on a PSSCH, wherein the first information is mapped to reserved bits of the $1^{st}$ stage SCI for the second terminal configured by the configuration information.

15. The second terminal of claim 14,
wherein a number of the reserved bits is associated with a number of available code division multiplexing (CDM) groups for the PSSCH DMRS port for the second terminal, and
wherein the number of the available CDM groups is configured by the configuration information.

16. The second terminal of claim 15,
wherein the number of the available CDM groups is 1 or 2.

* * * * *